(12) United States Patent
Kawatani et al.

(10) Patent No.: US 6,671,404 B1
(45) Date of Patent: Dec. 30, 2003

(54) METHOD AND APPARATUS FOR RECOGNIZING PATTERNS

(75) Inventors: Takahiko Kawatani, Kanagawa (JP); Hiroyuki Shimizu, Kawasaki (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/403,680

(22) PCT Filed: Feb. 13, 1998

(86) PCT No.: PCT/US98/02660

§ 371 (c)(1),
(2), (4) Date: Jan. 12, 2000

(87) PCT Pub. No.: WO98/36372

PCT Pub. Date: Aug. 20, 1998

(30) Foreign Application Priority Data

Feb. 14, 1997 (JP) ................................. 9-30202

(51) Int. Cl.[7] ................................. G06K 9/66
(52) U.S. Cl. ................................. 382/190
(58) Field of Search ................................. 382/190

(56) References Cited

U.S. PATENT DOCUMENTS

| | | | |
|---|---|---|---|
| 5,602,938 A | * 2/1997 | Akiyama et al. | 382/155 |
| 6,038,343 A | * 3/2000 | Shimizu et al. | 382/187 |
| 6,466,926 B1 | * 10/2002 | Kawatani | 706/20 |

FOREIGN PATENT DOCUMENTS

| | | | |
|---|---|---|---|
| EP | 0 574 937 A2 | 12/1993 | G06K/9/66 |
| JP | 08 106295 A | 4/1996 | G10L/3/00 |

OTHER PUBLICATIONS

Complementary Classifier Design Using Difference Principal Components Kawatani, T.; Shimizu, H.; Document Analysis and Recognition, 1997., Proceedings of the Fourth International Conference on , vol.: 2, Aug. 18–20, 1997 page(s): 875–880 vol. 2.*

(List continued on next page.)

Primary Examiner—Leo Boudreau
Assistant Examiner—Hussein Akhavannik

(57) ABSTRACT

A pattern recognition apparatus that comprises an input section, a feature extraction module, a feature transform module, a recognition section that includes a recognition dictionary, and a categorizer. The input section receives input patterns that include a pattern belonging to one of plural categories constituting a category set. The feature extraction module that expresses features of the pattern as a feature vector. The feature transform module uses transform vector matrices to transform at least part of the feature vector to generate an at least partially transformed feature vector corresponding to each of the categories. The transform vector matrices include a transform vector matrix generated in response to a rival pattern set composed of rival patterns misrecognized as belonging to plural ones of the categories. The plural ones of the categories constitute a category subset. The at least partially transformed feature vector is common to the ones of the categories constituting the category subset. The recognition dictionary stores both matching information and transformed matching information for each of the categories. The first transformed matching information has been transformed using the transform vector matrices. The recognition section generates at least one difference value for each of the categories by performing a matching operation between the matching information and the first transformed matching information on one hand, and at least one matching vector derived at least from the at least partially transformed feature vector corresponding to each of the categories on the other hand. The categorizer identifies the category to which the pattern belongs in response to the at least one difference value.

28 Claims, 7 Drawing Sheets

OTHER PUBLICATIONS

Handwritten Kanji Recognition with the LDA Method Kawatani, T.; Shimizu, H.; Pattern Recognition, 1998. Proceedings. Fourteenth International Conference on , vol.: 2, Aug. 16–20, 1998 page(s).: 1301–1305 vol. 2.*

Takahiko Kawatani et al., "Shape Quantification of Handprinted Numerals Using Recognition Results and Its Application", Systems and Computers in Japan, 1992, US, vol. 23, No. 5, pp. 55–66.

Takahiko Kawatani, "Handprinted Numerals Recognition by Learning Distance Function", Systems and Computers in Japan, vol. 25, No 10, Sep. 1, 1994, pp. 62–71.

Takahiko Kawatani, "Handprinted Numerals Recognition by Learning Distance Function", Trans. IEICE, D–II, vol. J76–D–II, No. 9, pp. 1851–1859.

Takahiko Kawatani, "Handprinted Numeral Recognition with the Learning Distance Function", Proceedings, IWFHR III, May 25–27, 1993, pp. 324–330.

Takahiko Kawatani et al., "Handwritten Numeral Recognition with the Improved LDA Method", Proceedings of ICPR'96, 1015–4651/96, (IEEE 1996), pp. 441–446.

Takahiko Kawatani et al., "Improvement of the LDA Method and its Application to Handwritten Numeral Recognition", Technical Report of IEICE, PRU95–220 (Mar. 1996), pp. 31–38.

Takahiko Kawatani, "Handprinted Numeral Recognition with the Learning Quadratic Discriminant Function", IEEE Computer Society Reprint, Proceedings of the Second International Conference on Document Analysis and Recognition, Tsukuba Science City Japan, Oct. 20–22, 1993, pp. 14–17.

Schwerdtmann, W. "Reduktion des Klassifikionsfehler Durch Angepasste Musterentwicklung" Nachrichtentechnische Zeitschrift, Jun. 1974, vol. 27, No. 6, pp. 233–238.

Jun Wang et l., "Resolving Multifont Character Confusion with Neural Networks", Pattern Recognition, vol. 26, No. 1, Jan. 1, 1993, pp. 175–187.

* cited by examiner

ME THOD AND APPARATUS FOR
RECOGNIZING PATTERNS

FIELD OF THE INVENTION

The invention relates to a pattern recognition apparatus and a pattern recognition method and in particular to a pattern recognition method that combines different recognition modules to improve the recognition accuracy.

BACKGROUND OF THE INVENTION

The demand for information processing involving pattern recognition is currently large and is rapidly increasing. Pattern recognition is used in such applications as image processing, text processing, and sound processing performed by computers. Consequently, improvements in pattern recognition technology are strongly desirable.

Pattern recognition is the process by which a physical phenomenon, such as an image, hand written or printed character or a sound, is converted to an electronic signal representing the phenomenon, a determination is made of which one of a number of possible categories in a category set the phenomenon belongs to, and a code indicating the determined category is generated. For example, in character recognition, an unknown printed character, such as the letter "A," may be scanned by an electronic scanner. The scanner generates an electronic pattern signal that represents a pattern composed of an array of a few thousand bytes that represent the unknown character. The pattern signal is then analyzed to determine to which of the categories in the category set corresponding to the letters A–Z the unknown character belongs. A code identifying this category as the category of the unknown character is then generated. For example, the ASCII code 33 representing the letter A may be generated.

Pattern recognition processing is preferably performed using features of the pattern extracted from the pattern signal instead of using the raw pattern signal. Processing the features extracted from the pattern signal is preferable because these features can often be processed faster, more accurately and cheaper than the raw pattern signal. If pattern signals containing extremely large quantities of information are processed, features are sometimes extracted, and the features must be processed. One objective of pattern recognition is to compress the information by representing the patterns using the features extracted from the pattern signal. Of course, the features must be extracted from the pattern signal in a way that does not impair the ability of the pattern recognition processing to recognize the pattern.

The feature f of a pattern p is usually defined by a set $\{x(p;m); m=1,2,3, \ldots, M\}$ of a finite number M of feature components $x(p;m)$. The feature f tangibly and quantitatively represents the characteristic qualities of the pattern. Consequently, since the feature f is represented by an M-dimensional vector whose m-th component is the feature component $x(p;m)$, the vector representation of the feature f is the feature vector $X(p)=(x(p;1), x(p;2), \ldots, x(p;m))^t$. The argument p indicates the feature vector $X(p)$ is the feature vector of the pattern p. The superscript t denotes vector transposition.

Even though the feature components are qualitative, they can be quantified and used.

If the pattern p undergoes various deformations, the value of the feature component $x(p;m)$ changes. Consequently, the feature vector $X(p)$ changes. However, as long as the deformed pattern belongs to its original category, the pattern recognition process must recognize it as belonging to that category.

A particular pattern that specified as being representative of the patterns belonging to a particular category or as being representative of a feature of the category is called the reference pattern of the category. The feature vector of the specified pattern is called the reference vector of the category. As an alternative to using a particular pattern as the reference pattern for the category, a hypothetical pattern obtained by averaging the patterns belonging to the category can be used as the reference pattern, and the feature vector of such hypothetical pattern can be used as the reference vector of the category.

In pattern recognition, an unknown pattern p is received and a pattern recognition process is performed. The pattern may determine whether the unknown pattern is similar to a known pattern q, or to determine which category the unknown pattern belongs to. Pattern recognition is essential in recognizing diagrams, characters, symbols, images, and sounds. General information about pattern recognition and the problems of pattern recognition can be found in Reference 1, Kazuo Nakada, Ed.: *Pattern Recognition and its Application*, Corona Co. (1978) (in Japanese) and Reference 2, Hidemitsu Ogawa, Ed.: *New Developments in Pattern Recognition and Understanding—The Challenges—Denshi Jyoho Tsushin Gakkai* (1992) (in Japanese).

Examples of pattern recognition in which the unknown patterns are character patterns will described below on the understanding that the principles set forth in the description can easily be applied to other forms of pattern recognition, such as image recognition and sound recognition. Character patterns are patterns representing letters, numbers, Kanji characters and the like. A pattern representing a character will from now on be referred to as a character pattern. Examples of possible feature components of character patterns include:

the length-to-width ratio of the character,
the number of horizontal lines,
the number of loops,
whether each square of a grid overlaid on the character is black or white,
the number of crossing points with a straight line in a specific direction, and
the transform coefficients of a Fourier transform of the character pattern.

A set of feature components such as that listed above is used to construct the feature vector so that the resulting feature vector can optimally represent the characters in the character set. The dynamic range of each feature component is selected to improve the accuracy of the pattern recognition to be described later. The feature component may be normalized using the standard deviation when this is needed.

Pattern recognition generates a category name for each character pattern subject to pattern recognition. The category code represents the reading, meaning, or code of the character pattern. For example, the category name of the category to which the character "A" belongs may be "category A." As noted above, a specific character pattern belonging to the category is selected as the reference pattern for the category. Alternatively, a hypothetical pattern obtained by averaging a number of character patterns belonging to a category may be used as the reference pattern. The feature vector of the reference pattern is adopted as the reference vector of the category.

At the heart of pattern recognition is a recognition processor that has the objective of determining that all unknown character patterns that represent the character "A," belong to category A, irrespective of whether the character pattern is deformed, and, further, that such character patterns do not belong to categories other than category A.

The processing performed by a character recognition apparatus after character pattern observation and reading is usually divided into a series of process modules that perform character pattern preprocessing, feature extraction, and recognition. Each process module can primarily be implemented using a computer and is realized by the computer performing a specific set of operations. All of the process modules, including observation of the character pattern, affect the result generated by the recognition module.

The strategy for increasing the accuracy of character recognition is to maximize the recognition ratio and to reduce the misrecognition ratio to zero. The recognition ratio is the fraction of character patterns that should belong to each category that are correctly recognized as belonging to that category. The misrecognition ratio is the fraction of characters patterns that do not belong to each category that are misrecognized as belonging to that category. In particular, many applications strongly demand that misrecognition does not occur, i.e., character patterns that do not belong to category A, for example, must not be allocated to category A.

Each input pattern can be regarded as a warping or a modification of a corresponding ideal pattern. Such modification can be regarded as an inverse form of pre-processing in the sense that the modification degrades the ability of the pattern recognition apparatus to recognize the pattern. This negative pre-processing must be one of the target factors taken into consideration when attempting to improve the performance of a pattern recognition apparatus for character patterns.

Known approaches to improving the recognition accuracy of a pattern recognition apparatus have added feedback control functions, such as adjusting the processing performed by each process module based on the recognition result, and have made various changes to the processing performed by the recognition module. The character pattern pre-processing referred to above includes normalizing the size, tilt, position, and line density of an input character pattern, and removal of noise such as spots and scratches.

Feature extraction referred to above analyzes an input character pattern to determine the values of the feature components that represent the shape and other characteristics of the character represented by the character pattern. The feature vector of the character pattern is constructed from the feature components. The number of feature components is typically of the order of several hundred, for example, 380 or 500, but may be as large as several thousand. One way of generating the feature vector of a character pattern is to hypothetically overlay the character pattern with a 64×64 grid and then determine whether each square of the grid is filled by a stroke of the character pattern. If the square is filled, the value 1 is allocated to the square. Otherwise, the value 0 is allocated. Each square of the grid may be regarded as a feature component, and a 4,096-dimensional feature vector whose elements are 0 and 1 is generated as the feature vector of the character pattern.

In another example, another effective feature in character recognition is a combination of, for example, the number of end points in the strokes (2 in the letter A), the number of loops (1 in the letter A), the number of bending points (1 in the letter A), the number of branch points (2 in the letter A), the number of crossing points (0 in the letter A), and their positions. Then, the smallest possible number of feature components consistent with a required recognition accuracy is selected, and a feature vector with the corresponding number of dimensions is constructed. Although increasing the number of dimensions of the feature vector tends to increase the recognition accuracy, increasing the number of dimensions increases the processing time and the memory capacity required.

In the recognition module referred to above, the feature vector extracted from each input character pattern is matched to the reference vector of each category in the category set to determine the category to which the input character pattern belongs. The reference vectors are determined before the character recognition processing starts and are stored in a recognition dictionary. The reference vectors are specific to the character set to which the unknown character belongs and to the particular way in which the character recognition is performed. The recognition dictionary includes a set of reference vectors, at least one reference vector for each category in the category set. Recognition modules often use a similarity function or a distance function as a recognition function to determine the category to which the unknown character pattern belongs. The distance between the character pattern and the reference pattern can be regarded as the distance between the character pattern and the category, as represented by the reference pattern. In particular, the distance between the feature vector of the character pattern and the reference vector of the reference pattern can be regarded as the distance between the character pattern and the category.

When the recognition module uses a distance function, a way of measuring the distance between character patterns is defined, and the distance between the input character pattern and each category is measured. Generally, the shorter the distance, the more similar are the character patterns. An input character pattern whose feature vector is within a fixed distance of the reference vector of a certain category can be said to belong to that category. Alternatively, a character pattern can be said to belong to the category to which the closest reference feature vector belongs.

When the feature vector of the input character is defined as in the example described above, the recognition module computes the Hamming distance (number of mutually different elements) in the 4,096-dimensional feature vector whose elements are 1 and 0. An input character is said to belong to the category whose reference vector is within a Hamming distance of 100 from the extracted feature vector of the input character.

Hamming distances are calculated between the feature vector extracted from the input character pattern and the reference vectors of all the categories in the category set. The category for which the Hamming distance is shortest is determined to be the category to which the input character pattern belongs.

Additional conditions may be imposed before an input character pattern is said to belong to the category whose reference vector is the shortest distance from the feature vector of the input character pattern. Examples of such additional conditions are that the shortest Hamming distance must be less than a first threshold value, and that the increment between the shortest Hamming distance and the second-shortest Hamming distance must be greater than a second threshold value.

In other examples of a highly accurate character recognition process, the recognition module may use as its recognition function a distance function that determines a Euclidean distance, a distance function that determines a weighted Euclidean distance, or a quadratic discriminant function. It is known that the recognition accuracy of such recognition functions can be increased by using a training process to improve the discriminant function and the character recognition dictionary. The Learning by Discriminant Analysis (LDA) method described by the inventor in *Handprinted Numerals Recognition by Learning Distance Function, Trans. of the IEICE*, Vol. J-76-D-11, No. 9, pp. 1851–59 (Reference 3), takes into account the deformation of character patterns by training the discriminant process. This reference additionally describes conventional character recognition processes in some detail, so a review of this reference provides a good basis for better understanding the invention disclosed below.

Learning by Discriminant Analysis uses Fisher's linear discriminant analysis. Part of the LDA method will now be described using symbolic representations that differ from the symbolic representations used in Reference 3 to be discussed below. In Learning by Discriminant Analysis, a distance function that gives a weighted Euclidean distance is trained and stored in the recognition dictionary. Specifically, the weighting vectors and constant terms of the distance function and the reference vectors are learned.

A known input character pattern p is input to the recognition apparatus as a training pattern and is first subject to conventional preprocessing and feature extraction to obtain the feature vector $X(p)=(x(p;1), x(p;2), \ldots, x(p;m), \ldots, x(p;m))^t$.

The reference vector $R(K)=(r(K; 1), r(K;2), \ldots, r(K;m), \ldots, r(K;M))^t$ of each category K in the category set $\{K\}$ is given, and the weighted Euclidean distance $D(p,K)$ between the input character pattern $X(p)$ and the reference vector $R(K)$ of each category in the category set is calculated. The weighted Euclidean distance is calculated using:

$$D(p, K) = D(X(p), R(K)) = \sum_{m=1}^{M} \omega(K; m)(x(p; m) - r(K; m))^2. \quad (1)$$

To be precise, $\omega(p,K)$ gives the square of the distance, but it will simply be called the distance here.

In this, $\omega(K;m)$ is the m-th weighting factor and is one element of the weighting vector $W(K)=(\omega(K;1), w(K;2), \ldots, w(K;m), \ldots, (K;M))^t$. The character recognition dictionary $L(\{K\})$ stores the parameters needed to perform the recognition operation. Typical parameters include the reference feature vectors $R(K)$ and the weighting vectors $W(K)$. $\{K\}$ indicates the entire set of categories of which the category K is a member and to which the input character can belong. During the matching operation, the reference dictionary provides a reference vector for each category in the category set. Consequently, the recognition dictionary related to the category set $\{K\}$ is designated as $L(\{K\})$.

Although the above format of the distance function is used to determine the weighted Euclidian distance for all of the categories in the category set, the parameters used in the distance function are set to specific values for each category. The distance function after learning by LDA differs from a conventional distance function based on the usual definition satisfying the distance formula. The LDA-based recognition function increases the differences between patterns.

In the following description, the category to which the input character pattern p actually belongs will be designated by $K(p)$. In the LDA-based pattern recognition operation, the learning operation is performed using training patterns, i.e., character patterns whose categories are known. The modified Euclidian distance $D(p,K)$ between each input character pattern and each category is determined for each category K in the category set. The recognition module determines that the input character pattern p belongs to the category $K_1(p)$ for which the determined modified Euclidian distance $D(p,K)$ is smallest. However, in some circumstances, the determined category $K_1(p)$ will differ from the category $K(p)$ to which the input character pattern p actually belongs. In this case, the input character pattern is misrecognized. In other circumstances, the increment between the distances $D(p,K_1)$ and $D(p,K_2)$ between the input character pattern on one hand and the category $K_1$ and the category $K_2$ on the other hand is small. The category $K_2$ differs from the category $K_1$. For such character patterns, the recognition result $K(p)$ cannot be said to be accurate with a high degree of confidence. A character pattern that is either incorrectly allocated to a category, or that cannot be said with a high degree of confidence to belong to a category, can be characterized in one of the following ways:

(1) A character pattern that actually belongs to a category different from category K but that the recognition module misrecognizes as belonging to the category K will be called an error pattern $p_{oe}$ belonging to the category K.

(2) A character pattern that actually belongs to a category different from category K but that the recognition module nearly misrecognizes as belonging to the category K will be called a near-miss pattern $p_{on}$ belonging to the category K.

The terms $p_{oe}$ and $p_{on}$ are the terms used in by the inventor Reference 3, referred to above and describe two types of rival patterns $p_{or}$ that constitute the rival pattern set of the category K. In LDA, the weighting vectors and constant terms and the reference vectors are learned so that all rival patterns $p_{or}$ are kept at least a minimum distance from the category K. The learning process can be performed for all of the categories or only for those categories for which misrecognition most easily takes place.

The rival pattern set of the category K is designated by $\Omega_r(K)$ and the in-category pattern set of the category K be designated by $\Omega_0(K)$. The in-category pattern set of the category K is composed of the training patterns defined as belonging to the category K. The learning process determines the coefficients $\{a(m); m=1 \text{ to } M\}$, $\{b(m); m=1 \text{ to } M\}$, and c so that these coefficients make the discriminant function $F(X(p),R(K))$ given by the equation below negative when the training pattern is a member of the in-category set $\Omega_0(K)$ and positive when the training pattern is a member of the rival pattern set $\Omega_r R(K)$. During this processing, the average of the feature vectors of the training patterns that belong to the in-category pattern set of the category K is used in the reference vector $R(K)$ of the category K. The discriminant function is calculated using:

$$F(X(p), R(K)) = \sum_{m=1}^{M} a(m)(x(p; m) - r(K; m))^2 + \sum_{m=1}^{M} b(m)(x(p; m) - r(K; m)) + c(K) \quad (2)$$

Since the discriminant function $F(X(p), R(K))$ is negative for the in-category pattern set $\Omega_0(K)$, $F(R(K),R(K))=c<0$.

The discriminant function $F(X(p),R(K))$ is then weighted by the factor $\gamma$ and the result is added to the original distance defined above in equation (1). Thus, the distance $D(X(p),R$ (K)) becomes the new distance G(X(p),R(K)) defined as follows:

$$G(X(p), R(K)) = G(p, K) = D(X(p), R(K)) + \gamma F(X(p), R(K)) = \sum_{m=1}^{M} (\omega(K;m) + \Delta\omega(K;m))\{x(p;m) - (r(K;m) + \Delta r(K;m))\}^2 + d(K) \quad (3)$$

The weighting factor γ in equation (3) is a positive number and is determined experimentally. The value of the weighting factor is selected to maximize the recognition accuracy over all of the categories in the category set {K}. The tests use publicly-available character databases or independently-compiled character databases. Often, the learning operation is performed using a portion of the character patterns in the character database and the remainder of the character patterns are used to verify the result of the learning operation.

As a result of performing the learning operation, the weighting vector, reference vector, and constant term are learned in the format with the added constant term d(K). The new reference vector and weighting vector are designated as:

$$T(K)=(r(K;1)+\Delta r(K;1), \ldots, r(K;M)+\Delta r(K;M))^t, \quad (4)$$

and $$U(K)=(\omega(K;1)+\Delta\omega(K;1), \ldots, \omega(K;M)+\Delta\omega(K;M)^t, \quad (5)$$

respectively.

The constant term d(K), weighting vector U(K), and reference vector T(K) are stored in the recognition dictionary. Next, discrimination using G(X(p),R(K)), which includes the constant term, is performed, and newly-generated rival patterns result from this discrimination are added to the rival pattern set of each category and the learning process is repeated In the examples described above, since the feature vectors and discriminant functions are unchanged in type from the original feature vectors, the scope of the learning process is restricted to a portion of the recognition process. This portion includes the contents of the recognition dictionary.

Pattern recognition methods that combine multiple different recognition processes to improve the character recognition accuracy are known. Specifically, combinations of recognition processes that use different features extracted from the pattern are known. The features may differ in their type and the number of feature components in them. Moreover, combinations of recognition processes that use different discriminant functions have been tried. Either of these possible combinations of recognition processes is effective at improving the recognition accuracy. However, conventional ways of using multiple recognition processes simply combine at least two independently-developed recognition processes. There is no indication that more effect measures have been taken such as designing one recognition process to recognize with high accuracy the characters that are not recognized by the other recognition process. As a result, the improvement in the recognition accuracy resulting from using a combination of two conventional recognition processes is limited.

What is needed is a pattern recognition apparatus and method in which the recognition accuracy is improved by integrating two recognition processes that have characteristics designed so that those patterns that cannot be recognized with high reliability by one of the recognition processes are recognized with the highest possible accuracy by the other recognition process.

What is also needed is a pattern recognition apparatus and method in which two recognition processes are integrated in a way that minimizes the percentage of patterns that are correctly recognized by the one of the recognition processes operating alone but are misrecognized by the recognition processes operating together.

Finally, what is needed is a pattern recognition apparatus and method in which two recognition processes are integrated and in which learning by the integrated recognition processes can is easily be implemented.

SUMMARY OF THE INVENTION

The invention provides a pattern recognition apparatus that comprises an input section, a feature extraction module, a feature transform module, a recognition section that includes a recognition dictionary and a categorizer. The input section receives input patterns that include a pattern belonging to one of plural categories constituting a category set. The feature extraction module expresses features of the pattern as a feature vector. The feature transform module uses transform vector matrices to transform at least part of the feature vector to generate an at least partially transformed feature vector corresponding to each of the categories. The recognition dictionary stores both matching information and first transformed matching information for each of the categories. The first transformed matching information has been transformed using the transform vector matrices. The recognition section generates at least one difference value for each of the categories by performing a matching operation between at least one matching vector derived at least from the at least partially transformed feature vector corresponding to each of the categories on one hand, and the matching information and the first transformed matching information on the other hand. The categorizer identifies the category to which the pattern belongs in response to the at least one difference value.

One embodiment additionally comprises a reliability determination module, the feature transform module transforms all of the feature vector to generate a transformed feature vector corresponding to each of the categories, and the recognition section includes first recognition module and a second recognition module. The first recognition module generates a first difference value for each of the categories by performing a matching operation between the matching information and a first matching vector derived from the feature vector. The second recognition module generates a second difference value for each of the categories by performing a matching operation between the first transformed matching information and a second matching vector derived from the first transformed feature vector corresponding to each of the categories. The reliability determination module receives the first difference value for each of the categories and indicates when pattern recognition based on the first difference value for each of the categories would be reliable. The categorizer identifies the category to which the pattern belongs in response either to the first difference value for each of the categories alone for each of the categories or to the first difference value and the second difference value for each of the categories. The categorizer identifies in response to the first difference values alone when the reliability determination module indicates that pattern recognition based on the first difference values would be reliable.

The invention also provides a method for recognizing patterns in which input patterns are received and features of the pattern are expressed as a feature vector. The input patterns include a pattern belonging to one of plural categories constituting a category set. A least part of the feature vector is transformed using transform vector matrices to generate an at least partially transformed feature vector corresponding to each of the categories. A matching operation is performed between a matching vector derived from the at least partially transformed feature vector corresponding to each of the categories on one hand, and matching information and transformed matching information for each of the categories on the other hand. The matching operation generates at least one difference value for each of the categories. The transformed matching information is matching information that has been transformed using the transform vector matrices. Finally, the category to which the pattern belongs is identified in response to the at least one difference value.

The transform vector matrices include a transform vector matrix for either (a) a category belonging to the category set, or (b) a category subset composed of plural categories belonging to the category set. The transform vector matrix may be generated by receiving training patterns whose respective categories are defined and expressing features of the training patterns as feature vectors. The categories to which the training patterns respectively belong are identified by performing a matching operation between first matching vectors derived from the feature vectors and the matching information. The categories to which the training patterns are identified as belonging are compared with the respective defined categories to define a rival pattern set for either (a) the category, or (b) the category subset, respectively. An average vector is determined from the feature vectors of all of the training patterns defined as belonging to either (a) the category, or (b) the category subset, respectively. A difference vector is calculated for each of the training patterns belonging to the rival pattern set using the average vector. An autocorrelation matrix of the difference vectors is calculated. Finally, eigenvectors of the autocorrelation matrix are adopted as transform vectors constituting the transform vector matrix either (a) the category, or (b) the category subset, respectively.

The transformed recognition information for a category belonging to the category set may be generated by receiving training patterns whose respective categories are defined and expressing features of the training patterns as feature vectors. The categories to which the training patterns respectively belong are identified by performing a matching operation between a first matching vector derived from the feature vector and the matching information. The categories to which the training patterns are identified as belonging are compared with the respective defined categories to define a rival pattern set for the category. The feature vectors of the training patterns are transformed to generate respective transformed feature vectors using the transform vector matrix for either (a) the category, or (b) a category subset to which the category belongs. The category subset is composed of plural categories belonging to the category set. A discriminant analysis is performed using the transformed feature vectors to generate a discriminant function. A modified difference value is calculated between the training patterns and each of the categories using the discriminant function. The categories to which the training patterns respectively belong are re-identified in response to the modified difference value for each of the categories. The categories to which the training patterns are identified as belonging in response to the modified difference values are re-compared with the respective defined categories to determine whether additional patterns are misrecognized as belonging to the category. The transformed recognition information is generated using the discriminant function when no additional patterns are misrecognized. Otherwise, the additional patterns are included in the rival pattern set of the category, and the discriminant analysis performing, modified difference value calculating, category re-identifying and re-comparing operations are repeated until no additional patterns are misrecognized.

DETAILED DESCRIPTION OF THE INVENTION

Figure 1:
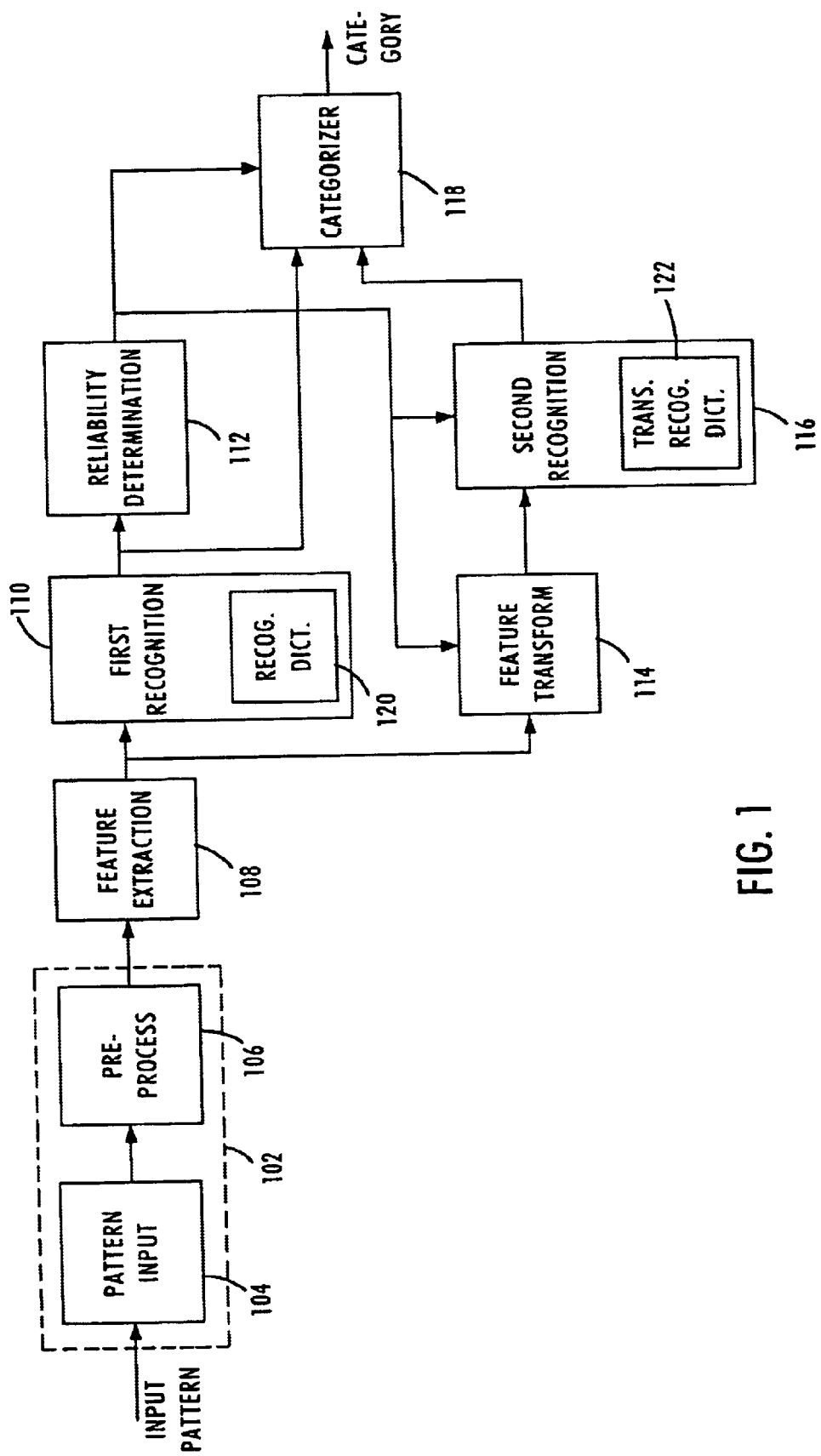
FIG. 1 is a block diagram of a first embodiment a pattern recognition apparatus according to the invention.

In the following description, the term difference value will be understood to encompass the following parameters, and any other parameter or parameters that quantify a similarity or dissimilarity between two vectors: the distance value of a distance function, the value of a similarity function, the value of a quadratic discriminant function, the value of a discriminant function, the value of another discriminant function, or the value of a combination of such functions. The value of the squared distance in LDA is another example of a difference value.

In the pattern recognition apparatus and method according to the invention, two different recognition modules determine a difference value between a matching vector characterizing the input character pattern and the reference vector of each category in the category set stored in the recognition dictionary. Since feature vectors are not necessarily extracted unchanged from the input pattern but may undergo a feature transformation and additionally or alternatively may have their number of dimensions reduced, the vectors characterizing the input patterns are called matching vectors in this disclosure.

Practical embodiments of the pattern recognition apparatus according to the invention are not used to perform the learning process using training patterns. Instead, a model of such a practical embodiment is simulated and the learning process is performed using the model. At the end of the learning process, the results generated by the learning process are transferred to the practical embodiment of the apparatus for use in actual pattern recognition. In the following description of the invention, unless it would otherwise be confusing, the practical embodiment of the pattern recognition apparatus and the model of this apparatus are not distinguished.

The pattern recognition apparatus according to the invention includes first and second recognition modules respectively equipped with first and second recognition dictionaries. The pattern recognition apparatus can perform either a character recognition operation or a learning operation in which the recognition dictionaries are optimized. In performing the learning operation, the pattern recognition apparatus first extracts a feature vector from a training pattern belonging to a given category and obtains a first difference value by matching the first recognition dictionary to a first matching vector related to the feature vector. The second recognition module then generates a second difference value by matching to the second recognition dictionary to a second matching vector related to the feature vector. The second matching vector includes a transformed feature vector obtained by transforming at least a portion of the feature vector using transform vector matrices. Finally, the category of the training pattern is determined from the first and second difference values.

The pattern recognition apparatus uses the above processing to perform a pattern recognition operation. In this, an unknown input pattern is processed instead of the training pattern.

In the learning operation, the pattern recognition apparatus additionally determines the eigenvector from (1) the rival patterns determined from the first difference values of at least one of the categories and (2) the training patterns belonging to the category. In addition, the pattern recognition apparatus performs the above-mentioned processing until the category of all of the training patterns in the training pattern set, composed of training patterns belonging to all of the categories in the category set, has been determined. Next, the pattern recognition apparatus determines the recognition accuracy of the pattern recognition performed on the training pattern set. This is determined by comparing the categories to which the training patterns actually belong with the categories determined from the first and second difference values. Finally, the second recognition dictionary is modified in a manner designed to increase the recognition accuracy, and the categories of all the training patterns in the training pattern set are re-determined and the recognition accuracy is re-determined.

In one embodiment of the invention, the first matching vector includes all of the feature components of the feature vector extracted from each training pattern, and the second matching vector includes a transformed feature vector obtained by transforming a vector that includes all of the feature components of the feature vector extracted from the training pattern.

In another embodiment of the invention, the first matching vector is composed of the first group of the feature components of the feature vector extracted from the training pattern. The second matching vector can include a transformed feature vector obtained by transforming a vector composed of a second group, different from the first group, of the feature components of the feature vector extracted from the training pattern.

When needed to conserve the computational resources required to provide the pattern recognition apparatus, the first matching vector can have a reduced number of dimensions and can be composed of a first group of the feature components of the feature vector extracted from the training pattern.

Because the pattern recognition apparatus and method according to the invention are usually embodied in a computer or digital signal processor, the invention may additionally be embodied in a memory device, such as a disk or flash memory, on which is stored a program designed to instruct the computer to perform the processing described above.

One example of a pattern recognition system embodying the pattern recognition apparatus according to the invention and capable of performing the pattern recognition method according to the invention is composed of a learning center in communication with a terminal. The terminal stores the recognition dictionaries and the transform vector matrices and performs the function of determining the category of the input character pattern. The terminal makes this determination on the recognition dictionaries and the transform vector matrices. In response to a notification of a rival pattern generated at the terminal, the pattern recognition apparatus is designed so that the learning center updates the recognition dictionary and the terminal updates the transform vector matrices.

The recognition system can be embodied in a computer or digital signal processor with functions capable of easily relearning in response to changes in the training patterns and increases in the misrecognition rate, and automatically learning based on changes in the recognition accuracy.

A variation of the pattern recognition apparatus according to the invention can have multiple recognition units in a serial arrangement. Each recognition unit is composed of a recognition dictionary and a recognition module. At least one recognition unit accepts the input pattern. At least one recognition unit receives the output of another recognition unit and generates an output which it forwards to another recognition unit. At least one recognition unit receives the matching vector related to the feature vector of the input pattern and transforms the features represented by the feature vector using the transform vector matrices. At least one recognition unit forwards its output to the recognition module. The recognition module determines the category of each input pattern. Each transform vector matrix is determined based on the rival pattern determined by the recognition unit connected to the input side for the transform vector matrix. In this structure, each recognition unit reliably recognizes a pattern that the recognition units previous to the recognition unit have had difficulty recognizing. This way, the recognition accuracy of the multiple recognition unit pattern recognition apparatus can be further improved.

FIG. 1 is a block diagram of a first embodiment 100 of a pattern recognition apparatus according to the invention. The pattern recognition apparatus includes the pattern input section 102 composed of the pattern input module 104 and the pre-processing module 106; the feature extraction module 108; the first recognition module 110; the reliability determining module 112; the feature transform module 114; the second recognition module 116 and the categorizer 118. The processing performed by each of these modules will be described in detail next.

Each input pattern p is received by the pattern input module 104 that forms part of the pattern input section 102. The pattern input module passes the pattern to the pre-processing module 106 which normalizes the size, position, rotation etc., of the pattern. The preprocessing module passes the normalized pattern to the feature extraction module 108 which extracts from the pattern the features that will be used for recognizing the pattern. The feature extraction module expresses the features extracted from the pattern p as the feature vector $X(p)$.

The first recognition module 110 adopts the feature vector $X(p)$ as the matching vector for the pattern p. The first recognition module performs a first matching operation between the matching vector of the pattern p and the reference vector $R(K)$ and the weighting vector $W(K)$ of each category K constituting the category set $\{K\}$. The reference vectors and weighting vectors are stored in the first recognition dictionary 120. The matching operation performed by the first recognition module generates a first difference value between the matching vector of the input pattern and the reference vector for each category. Each first difference value quantifies the difference between the input pattern and the respective category.

The first recognition module 110 forwards the first difference value for each category in the category set $\{K\}$ to the reliability determining module 112 and to the categorizer 118. Based on the first difference values for the categories in the category set, the reliability determining module generates an output signal whose state indicates whether or not pattern recognition based on the first difference values would be reliable. The reliability determining module can determine, for example, the increment between the smallest of the first difference values and the next-smallest of the first difference values. The reliability determining module can then compare the reliability value with a predetermined threshold value to determine the state of its output signal.

If the reliability value is greater than, or not less than, the predetermined threshold value, the reliability determining module 112 determines that pattern recognition based on the first difference values generated by the first recognition module 110 would be reliable. In this case, the reliability determining module generates its output signal in a HIGH RELIABILITY (HIGH) state. The reliability determining module passes the output signal to the categorizer 118, the feature transform module 103 and the second recognition module 116. In response to the reliability module output signal in the HIGH state, the categorizer identifies the category in the category set $\{K\}$ for which the first difference value is smallest and outputs a code indicating this category as the category of the input pattern. Moreover, the HIGH state of the output signal inhibits operation of the feature transform module 103 and the second recognition module 116.

If the reliability result is less than the predetermined threshold value, the reliability determining module 112 determines that pattern recognition based on the first difference values generated by the first recognition module 110 would not be reliable. In this case, the reliability determination module generates its output signal in the LOW RELIABILITY (LOW) state. In response to the reliability module output signal in the LOW state, the feature transform module 114 and the second recognition module 116 perform additional processing to generate a second difference value, and the categorizer determines the category of the input pattern in response to both the first and second difference values. This increases the reliability of the recognition result generated by the categorizer.

The feature transform module 114 receives the feature vector of the input pattern from the feature extraction module 108 and temporarily stores it. When the reliability determining module 112 generates its output signal in the LOW state, the feature transform module applies a transform to the feature vector $X(p)$ of the input pattern p. The transform is performed using the transform vector matrix $\phi(K)$ for each category K in the category set $\{K\}$. Generation of the transform vector matrix $\phi(K)$ will be described below with reference to FIG. 2. Transforming the feature vector $X(p)$ using the transform vector matrix $\phi(K)$ of each category K in the category set generates the transformed feature vector $Y(p;K)$ for each category in the category set.

The m-th feature component $y(p;K;m)$ of the transformed feature vector $Y(p;K)$ is given by:

$$y(p;K;m)=X(p)\phi(K;m) \qquad (6)$$

where $\phi(K;m)$ is the m-th transform vector of the transform vector matrix $\phi(K)$ of category K. The transform module forwards the transformed feature vector $Y(p;K)$ for each category to the second recognition module 116.

The second recognition module 116 adopts the transformed feature vector $Y(p;K)$ of the input pattern p and the category K received from the transform module 114 as the matching vector of the pattern p for the category K. The second recognition module performs a second matching operation between each transformed feature vector, which is the matching vector in this recognition process, and the page $L(\{K\};\phi(K))$ of the transformed recognition dictionary $L(\{K\})$ 122 corresponding to the transform vector matrix $\phi(K)$. The transformed recognition dictionary is generated using LDA, for example. The page $L(\{K\};\phi(K))$ stores the transformed reference vector $R(\phi(K))$, the transformed weighting vector $T(\phi(K))$, and, when needed, the constant term $d(\phi(K))$ of each category K in the category set $\{K\}$ corresponding to transformation by the transform vector matrix $\phi(K)$ for the category. For the input pattern p matching for the category K is performed between the transformed feature vector $Y(p;K)$ of the pattern p for the category K and the transformed reference vector $R(\phi(K))$, the transformed weighting vector $T(\phi(K))$, and, when needed, the constant term $d(\phi(K))$ of the category K stored in the page $L(\{K\};\phi(K))$ of the reference dictionary.

Using the transformed reference vectors and transformed weighting vectors for each category stored in the page $L(\{K\};\phi(K))$ of the transformed recognition dictionary $L(\{K\})$ 122 corresponding to the transform vector matrix $\phi(K)$ of each category K, the second recognition module 116 generates a second difference value between the transformed feature vector $Y(p;K)$ of the input pattern p for the category K as the matching vector and the transformed reference vector $R(\phi(K))$ of each category in the category set $\{K\}$. The second recognition module forwards the second difference value for each category in the category set to the categorizer 118. The structure of the transformed recognition dictionary $L(\{K\};\phi(K))$ page will be described below.

When the output signal of the reliability determining module 112 is in its LOW state, indicating that pattern recognition based solely on the first difference values generated by the first recognition module 110 would not be reliable, the categorizer 118 modifies the first difference value for each category prior to determining the category of the input pattern. For each category, the categorizer multiplies the second difference value determined for each category by the second recognition module 116 by a constant multiplier, and adds the result to the first difference value received for the category from the first recognition module to generate a modified difference value. The categorizer then identifies the category in the category set $\{K\}$ for which the modified difference value is smallest and provides a code indicating this category as the category of the input pattern.

The multiplier used in the categorizer 118 to multiply the second difference values is selected experimentally to increase the recognition accuracy over all of the categories. A publicly-available pattern database such as a character pattern database is used to train and to test the pattern recognition apparatus according to the invention. Some of the character patterns in the database are used as training patterns and the remainder is used as test patterns. For example, four-fifths of the character patterns in the data base can be used as training patterns, and the remainder can be used as test patterns. The multiplier that maximizes the overall recognition accuracy is selected. Moreover, an independently-compiled character database can be used in addition to the publicly-available character database to increase the accuracy of the character recognition in a specific region of the character set where higher-than-average recognition accuracy is desired. Furthermore, the complete set of recorded character patterns can be used as training patterns. However, if a portion of the recorded character patterns is used as training patterns and the remainder as test patterns, the stability and robustness of the recognition performance of the pattern recognition apparatus can be evaluated more reliably. It is also effective to interchange the recorded character patterns used as training patterns and those used as test patterns.

Although the feature transform module 114 and the second recognition module 116 are shown as operating in response to the output signal of the reliability determination module 112, this is not critical. The feature transform module and the second recognition module can generate second difference values for each input pattern. In this case, the HIGH state of the output signal of the reliability determination module causes the categorizer 118 to ignore the second difference values, and to determine the category of the input pattern in response to the first difference values alone.

Figure 2:
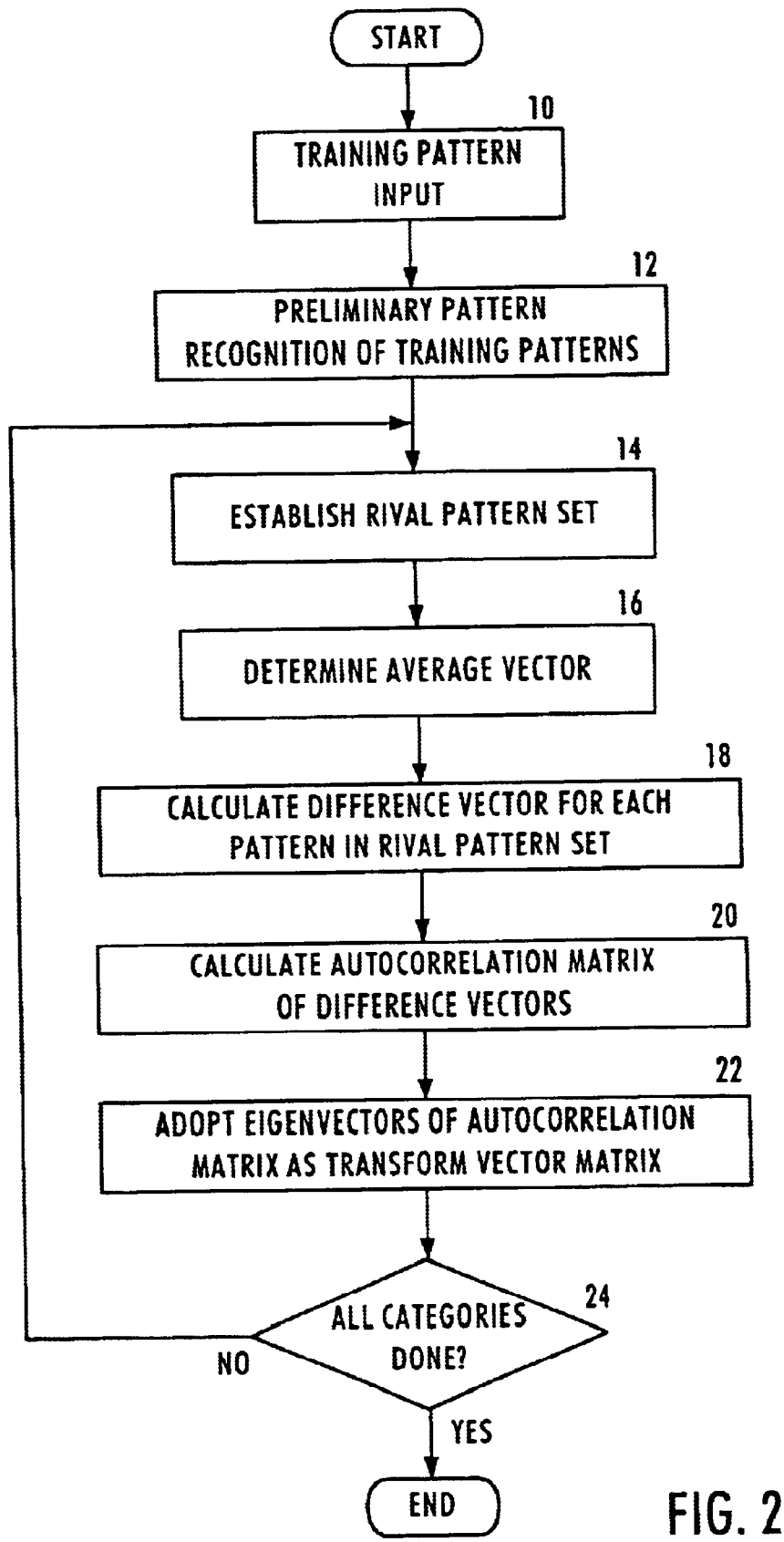
FIG. 2 is a flow diagram showing how the transform vector matrices used by the pattern recognition apparatus are generated.

FIG. 2 is a flow chart illustrating the processing performed to generate the transform vector matrix $\phi(K)$ for each category K in the character set $\{K\}$. This processing may be performed in the embodiments of the pattern recognition apparatus described in this disclosure, or may be performed independently. In the latter case, the results of the processing are loaded into the pattern recognition apparatus. First, in step 10, a set of training patterns is input. The category to which each training pattern is defined. In step 12, a preliminary pattern recognition operation is performed on the training patterns. This operation may be performed using the input module 102, feature extraction module 108, first recognition module 110, the reliability determination module 112 and the categorizer 118 of the embodiment of the pattern recognition apparatus shown in FIG. 1. For each training pattern q, the preliminary pattern recognition operation generates a difference value between the training pattern and the reference feature vector for each category K in the category set $\{K\}$, a determination of the category of the training pattern and a determination of the reliability of the category determination.

In step 14, the recognition results generated by the preliminary pattern recognition operation performed in the step 12 are evaluated to generate a rival pattern set for each category. Two types of patterns are allocated to the rival pattern set of each category. Evaluation of the recognition results with respect to the category K will now be described.

The first type of pattern allocated to the rival pattern set of the category K is a pattern whose defined category is not category K, but which the preliminary pattern recognition operation performed in step 12 misrecognized as belonging to category K. This type of rival pattern will be called an error pattern $p_e(K)$ in the rival pattern set of category K.

The second type of pattern allocated to the rival pattern set of the category K is a pattern whose defined category is not category K, but which the preliminary pattern recognition operation performed in step 12 nearly misrecognized as belonging to category K. A pattern is nearly misrecognized as belonging to category K if category K is the category with the second-smallest difference value, and the increment between the smallest difference value and the second-smallest difference value is small. This type of rival pattern will be called a near-miss pattern $p_n(K)$ in the rival patter set of category K. The near-miss patterns are identified by the reliability determination module 112.

The error patterns $p_e(K)$ are identified by comparing each training pattern that the preliminary pattern recognition operation allocates to category K with the defined category of the training pattern. A training pattern allocated to category K and whose defined category is not category K is identified as an error pattern.

The near-miss patterns $p_n(K)$ are identified in the following way. For the training patterns whose defined category is not category K, the increment is determined between the difference value between the training pattern and category K and the difference value between the training pattern and the category to which the preliminary pattern recognition operation allocated the training pattern. Next, a fixed number of training patterns is selected from among the training patterns whose increment is smaller than a threshold value. In performing this selection, the training patterns are selected in order of their increments, starting with the smallest.

Preferably, both error patterns and near-miss patterns constitute the rival pattern set $\Lambda(K)$ of the category K. Alternatively, the near-miss patterns can be omitted so that the rival pattern set consists exclusively of error patterns. However, tests have shown that including near-miss patterns in the rival pattern set produces better results. In particular, when there are few error patterns the effect of including the near-miss patterns produces a significant improvement.

In step 16, the feature vectors of all the training patterns defined as belonging to the category K are averaged to generate the average vector $R_m(K)$ of the category K.

In step 18, the feature vector of each rival pattern in the rival pattern set is subtracted from the average vector $R_m(K)$ of the category K to generate a difference vector for the rival pattern.

In step 20, the autocorrelation matrix of the difference vectors generated in step 18 is determined. This is done as follows:

The feature vector of the n-th rival pattern $p_r,n$ in the rival pattern set of the category K is $X(K;r;n)$. The difference vector determined in step 18 for the rival pattern is $\Xi(K;r;n)$, where:

$$\Xi(K;r;n)=X(K;r;n)-R_m(K).$$

The autocorrelation matrix $Q(K;r)$ of the difference vector $\Xi(K;r;n)$ is given by:

$$Q(K,r) = \frac{\sum_{n=1}^{N} \Xi N(K;r;n)\Xi(K;r;n)^t}{N(K;r)} \quad (7)$$

where $N(K;r)$ is the total number of rival patterns in the rival pattern set, and the summation from 1 to N is a summation over the rival pattern set, and t denotes the transposition of the difference vector.

In step 22, the eigenvectors $\phi(K;m)$ of the autocorrelation matrix $Q(K;r)$ are determined and adopted to form the transform vector matrix $\phi(K)$ for the category K. The maximum number of transform vectors constituting the transform vector matrix for the category K is equal to the number of dimensions M of the feature vectors. The m-th transform vector of the transform vector matrix is the eigenvector of the autocorrelation matrix with the m-th largest eigenvalue.

The difference vector calculated in step 18 represents the difference between each rival pattern in the rival pattern set and the average vector of the category K. The eigenvectors of the autocorrelation matrix Q(K;r) are regarded as an orthogonal expansion of the difference between the category K and the rival patterns. Consequently, the eigenvectors of the autocorrelation matrix Q(K;r) accurately reflect the main components of the difference between the category K and the rival patterns. Projections of the input feature vector on the eigenvectors of the autocorrelation matrix Q(K;r) were found to be extremely effective in separating the in-category pattern set of the category K from the rival pattern set.

At step 24, a test is performed to determine whether a transform vector matrix has been generated for each category K in the category set {K}. If the result is YES, execution ends. If the result is NO, execution returns to step 14 so that the transform vector matrix for anther category in the category set can be generated.

In an alternative way of determining the transform vector matrix of the category K, the covariance matrix S(K) of the in-category pattern set of the category K is determined in addition to the average vector for the category. The in-category pattern set is composed of the training patterns whose defined category is category K. Then, after the autocorrelation matrix Q(K;r) of the rival pattern set of the category K has been calculated in step 20, it is multiplied by inverse of the covariance matrix of the in-category pattern set to generate the matrix $S(K)^{-1}Q(K;r)$. Finally, in step 22, the eigenvectors of the matrix $S(K)^{-1}Q(K;r)$ are determined and adopted to form the transform vector matrix φ(K) for the category K.

An eigenvector of the autocorrelation matrix Q(K;r) defines an axis along which the squared average, taken over all of the rival patterns, of a projection of the difference vector of each rival pattern onto the axis is a maximum. In contrast, an eigenvector of the matrix $S(K)^{-1}Q(K;r)$ defines an axis along which the squared mean, taken over all of the rival patterns, of a projection of the difference vector of each rival pattern onto the axis increases, and along which scattering is relatively small when the in-category pattern set of the category is projected. This is also considered to be extremely effective in separating the in-category pattern set of the category K from the rival pattern set.

In the adoption process performed in step 22, the eigenvector with the largest eigenvalue is adopted as one transform vector of the transform vector matrix. In addition, a number of the eigenvectors having progressively smaller eigenvalues is additionally selected. The number of eigenvectors selected determines the complexity of the transform vector matrix and the complexity of the processing performed using the transform vector matrix. Thus, it is desirable to select only those eigenvectors whose eigenvalues are significant. The number of eigenvalues selected is the number of eigenvectors between the eigenvector with largest eigenvalue and the eigenvector of a desired eigenvalue where the summation of eigenvalues from the largest eigenvalue to the desired eigenvalue is greater than a predetermined fraction, for example, 0.9, of the sum of all of the eigenvalues. Alternatively, the number of eigenvectors selected can be determined experimentally.

In the above description, the eigenvectors determined for each category are adopted as the transform vectors constituting the respective transform vector matrix used to transform the feature vectors of the input patterns. Alternatively, the feature vector transformation can use transform vector matrices generated from a super set of the rival pattern sets of a desired number of categories constituting the category subset {K}'. The transformation effected such transform vector matrices takes multiple categories into consideration.

The category subset {K}' is composed of a desired number of categories. Categories are selected for inclusion in the category subset {K}' by ranking all of the categories in the category set {K} in the order of their number of error patterns and the size of their rival pattern sets, with priority being given to the number of error patterns. The desired number of the categories is then taken from the large number of error patterns/large rival pattern set end of the ranking to constitute the category subset {K}'. Optionally, the category subset {K}' can be made co-extensive with the category set {K}.

Then, in a step analogous to step 20, the autocorrelation matrix Q({K}';r) of the difference vectors of the category subset {K}' is calculated using equation (8), which is based on equation (7) that gives the autocorrelation matrix Q(K;r) of the difference vector ≡(K;r;n) of the category K in category subset {K}':

$$Q(\{K\}', r) = \frac{\sum_{k=1}^{|K|} \sum_{n=1}^{N} \Xi(K; r; n)\Xi(K; r; n)^t}{\sum_{k=1}^{|K|} N(K; r)} \qquad (8)$$

$$= \frac{\sum_{k=1}^{|K|} N(K; r)Q(K; r)}{\sum_{k=1}^{|K|} N(K; r)}$$

In this, the summation from 1 to {K} denotes that the terms are added across those categories in the category set {K} that constitute the category subset {K}'.

In a step analogous to step 22, the m-th eigenvector φ({K}';m) of the autocorrelation matrix Q({K}';r) of the difference vectors of the category subset {K}' is determined and adopted as the m-th transform vector of the transform vector matrix φ({K}') for the category subset {K}'.

In an alternative similar to that described above, the average covariance matrix S({K}) of the training patterns belonging to the category subset {K}' is found and the transform vector φ({K}';m) is replaced by the eigenvector of $S(\{K\})^{-1}Q(\{K\}';r)$. This provides the same effect as that provided by replacing the eigenvector φ(K;m) by the eigenvector of $S(K)^{-1}Q(K;r)$, as described above.

Figure 3:
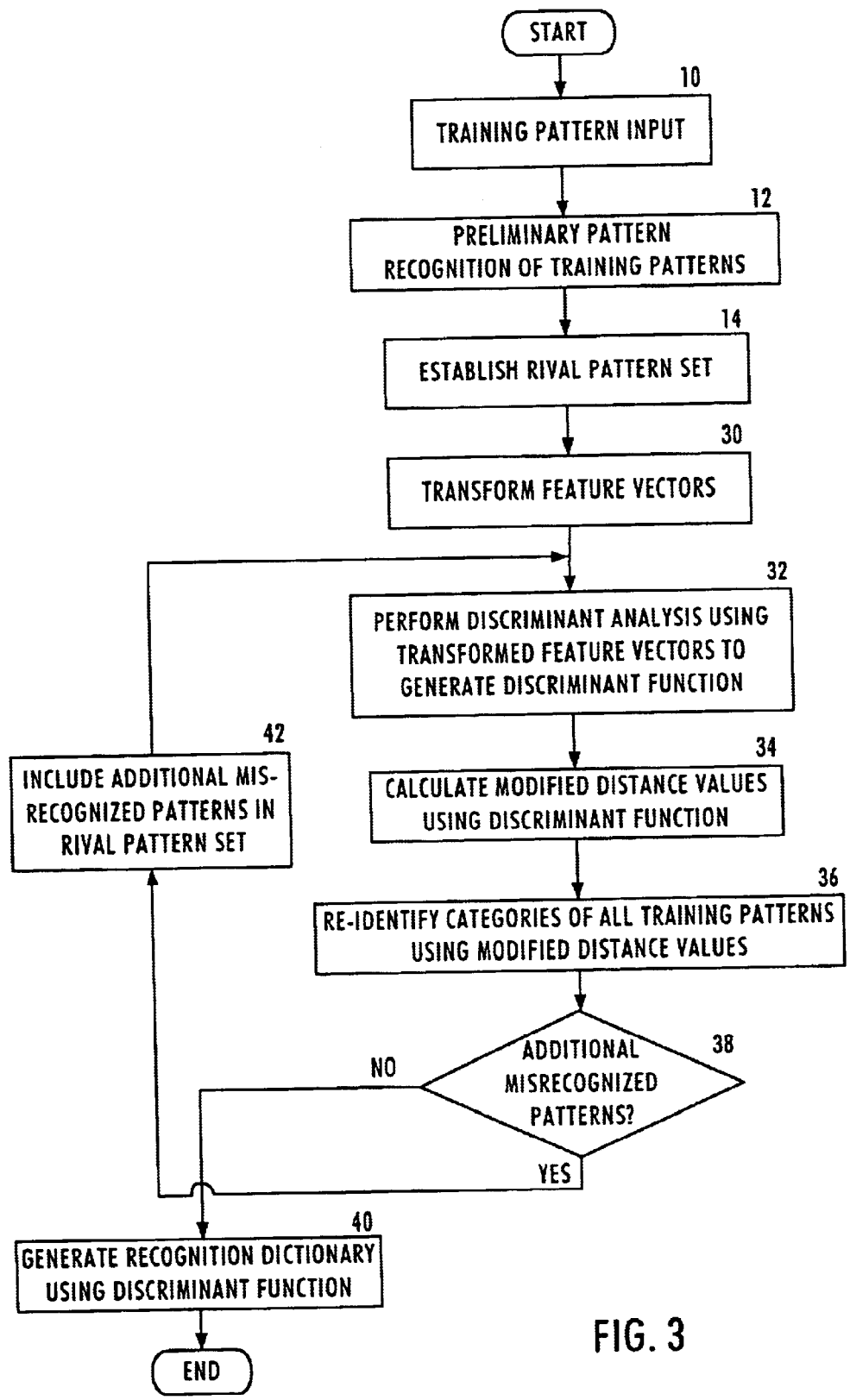
FIG. 3 is a flow diagram showing how the recognition dictionary used to perform pattern recognition on the transformed feature vectors is generated.

FIG. 3 shows a flow diagram of the process for generating the transformed recognition dictionary L({K};φ(K)). The same processing in which φ(K) is replaced by φ({K}') can be used to generate the transformed recognition dictionary L({K};φ({K}')). This processing may be performed in the embodiments of the pattern recognition apparatus described in this disclosure, or may be performed independently. In the latter case, a suitable storage or transmission medium is used to load the results generated by the processing into the pattern recognition apparatus.

In the transformed recognition dictionary generation processing shown in FIG. 3, steps 10–14 are identical to steps 10–14 in the transform vector matrix generating process described above with reference to FIG. 2 and will not be described in detail. The training patterns that were misrecognized or nearly misrecognized as belonging to each category in the preliminary pattern recognition step 12 are identified as the rival pattern set Λ(K) of the category in step 14.

In step 30, the feature vectors of all of the training patterns defined as belonging to each category are transformed using the transform vector matrix φ(K) of the category.

In step 32, a discriminant analysis is performed between the in-category pattern set and the rival pattern set of each category. The variables used in the discriminant analysis are the feature vectors transformed using the transform vector matrix φ(K) of the category. The discriminant analysis derives a discriminant function that optimally separates the rival pattern set and the in-category pattern set of the category. The discriminant analysis may be performed using the procedure set forth by the inventor in Reference 3.

In step 34, the value of the discriminant function determined for each category in step 32 is multiplied by a constant and the result is added to the difference value for each category determined for each training pattern in step 12 to generated a modified distance value.

In step 36, the category of each of the training patterns is then determined using the modified distance values generated in step 34.

In step 38, the pattern recognition result generated in step 36 for each training pattern is evaluated, and a test is performed to determine whether the processing performed in steps 32, 34 and 36 has resulted in new misrecognized patterns. New misrecognized patterns are error patterns that are not already members of the rival pattern set of the category. If the result of the test is NO, execution advances to step 40. If the result of the test is YES, and new misrecognized patterns have been generated, execution passes to step 42, where the new misrecognized patterns of each category are added to the rival pattern set of the category. Execution then returns to step 32, and the loop composed of steps 32, 34, 36, 38 and 42 repeats until the test result in step 38 is NO.

In step 40, the transformed recognition dictionary is generated using the discriminant function generated in the last iteration of step 32.

When the m-th component of the average vector $R_m(\phi(K))$ of the transformed feature vector $Y(K;p)$ of category K is designated by $r_m(\phi(K);m)$, the discriminant function $F(Y(K;p), R_m(\phi(K)))$ of the category K is given by:

$$F(Y(K; p), R_m(\Phi(K))) = \sum_{m=1}^{M} a(m)(y(p; m) - r_m(\Phi(K); m))^2 +$$

$$\sum_{m=1}^{M} b(m)(y(p; m) - r_m(\Phi(K); m)) + c(\Phi(K))$$

$$= \sum_{m=1}^{M} a(m)\left(y(p; m) - (r_m(\Phi(K)); m) - \frac{b(m)}{2a(m)}\right)^2 +$$

$$\sum_{m=1}^{M} \frac{b(m)^2}{4a(m)} + c(\Phi(K))$$

The weighting vectors of which a(m) is the m-th component, the reference vector of which $r_m(\phi(K);m)-b(m)/(2a(m))$ is the m-th component, and the constant terms having the value of $$\sum_{m=1}^{M} b(m)^2/(4a(m)) + c(\Phi(K))$$

are stored as the category K recognition dictionary in the transformed recognition dictionary. According to this procedure, when combined with the discriminant functions used in step 12, a discriminant function can be determined to maximize the recognition accuracy.

The inventor has discovered that in iterations of the learning process, the recognition accuracy initially increases, but the learning effect gradually decreases and the recognition accuracy may actually decrease. This fact is used to stop the learning process automatically when either of the following conditions are met:

(1) the recognition accuracy reaches a specific value; or
(2) an additional iteration of the learning process does not improve the recognition accuracy.

When the second criterion is adopted, the contents of the recognition dictionary before the iteration of the learning process is begun and the transform vector matrix for each category is stored in memory for use. The pattern recognition apparatus according to the invention can include a display that notifies the user that the learning iteration has stopped and that displays the achieved recognition rate and the number of iterations of the learning process performed.

In the above processing, the rival patterns can be automatically compiled. The categories and the character patterns are obtained as training patterns and test patterns. The error patterns and near-miss patterns are extracted. At this time, the error patterns are automatically determined as described above. If the maximum number of near-miss patterns is specified, the near-miss patterns are automatically determined. Alternatively, a predetermined number of near-miss patterns is selected only when the number of error patterns is less than the predetermined number.

The training patterns, including the test patterns when necessary, are given to the recognition system according to the invention implemented on a computer as described above and are automatically learned. Consequently, the recognition system according to the invention has a simple implementation and can be easily adapted to a given application by providing it with training patterns corresponding to the application.

Figure 4:
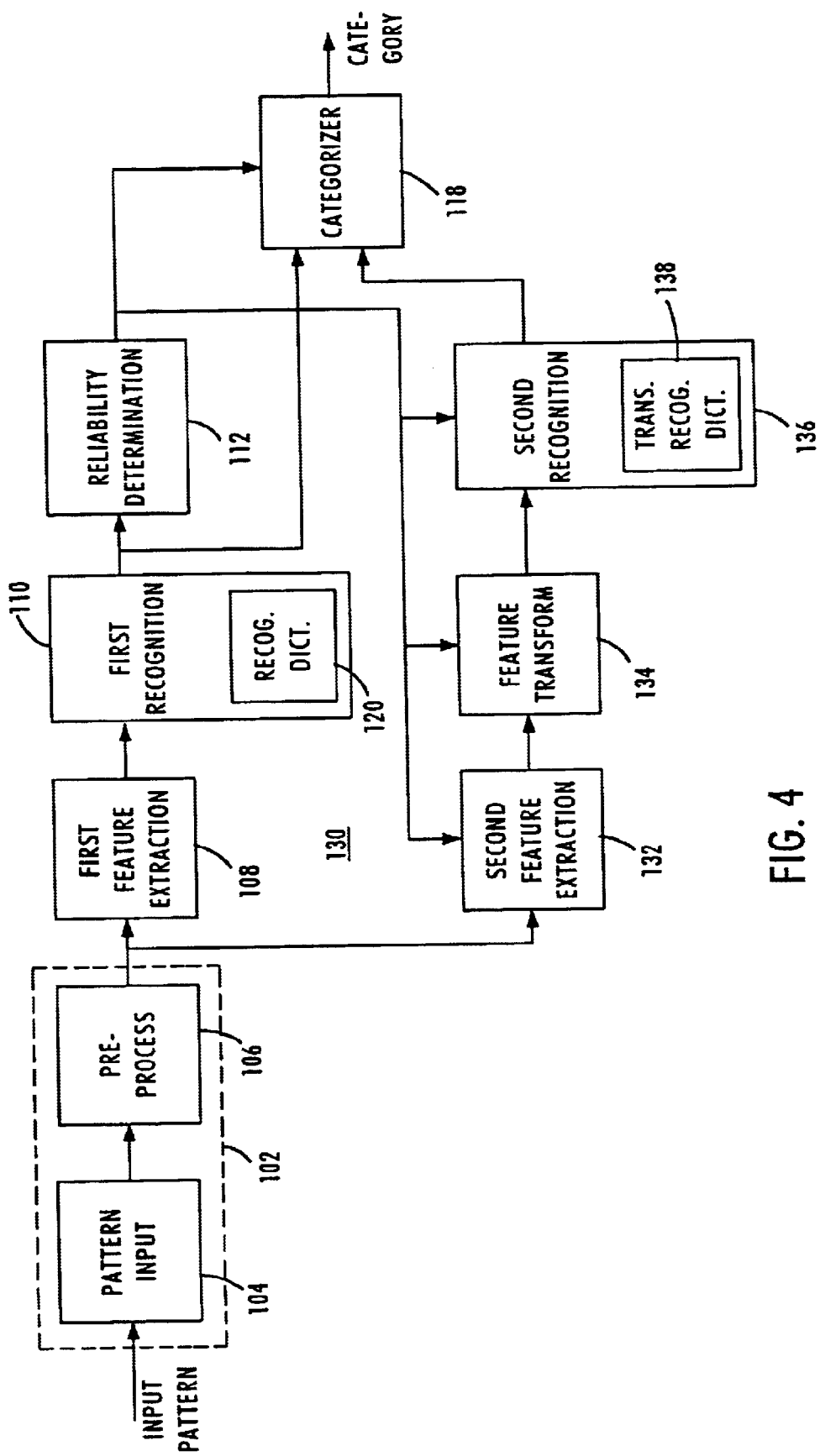
FIG. 4 is a block diagram of a second embodiment of the pattern recognition apparatus according to the invention.

FIG. 4 is a block diagram of a second embodiment 130 of a pattern recognition apparatus according to the invention. In this, elements corresponding to elements of the first embodiment described above with reference to FIG. 1 are indicated by the same reference numerals and will not be described in detail. In this embodiment, the input section 102 feeds pre-processed input patterns to the feature extraction module 108, which is a first feature extraction module, and also to the second feature extraction module 132. The first feature extraction module extracts a first feature vector from each input pattern. The first feature vector is subject to the operations performed by the first recognition module 110 and the reliability determination module 112. The second feature extraction module is similar to the first feature extraction module, but extracts different feature components from each pre-processed input pattern to generate a second feature vector.

The feature transform module 134 operates similarly to the feature transform module 114 described above to transform each second feature vector generated by the second feature extraction module 132 using the transform vector matrix φ(K) for each category in the category set {K}. The second recognition module 136 operates similarly to the second recognition module 116 to perform a recognition process on the transformed second feature vectors using the transformed recognition dictionary 138. For each input pattern, the second recognition module generates a difference value between the input pattern and each category in the category set {K}.

The categorizer 118 determines the category of each input pattern solely using the first difference values generated by the first recognition module 110 when the reliability determination module output signal is in its HIGH state, and using both the first difference values generated by the first recognition module 110 and the second difference values generated by the second recognition module 116 when the reliability determination module output signal is in its LOW state.

The second feature extraction module 132, the feature transform module 134 and the second recognition module 136 are shown as operating in response to the output signal of the reliability determination module 112 so that they collectively generate second difference values only for those input patterns that the reliability determination module determines that pattern recognition based on the first difference values generated by the first recognition module 110 would not be reliable. Alternatively, these modules may generate second difference values for every input pattern. In this case, when the state of the output signal of the reliability determination module is in its HIGH state, the categorizer ignores the second difference values generated by the second recognition module and determines the category of the input pattern solely in response to the first difference values generated by the first recognition module.

The second embodiment differs from the first embodiment in that the feature transform module 134 operates on the second feature vectors generated by the second feature extraction module 132 instead of on the feature vectors generated by the feature extraction module 108, and that the first and second feature extraction modules extract different sets of features from the pre-processed input pattern. The second recognition module 136 can be simplified by enabling it to operate on a smaller set of features. Based on tests that determine the recognition accuracy using test patterns whose categories are known, as described above, the second embodiment or the first embodiment can be selected, depending on which gives the better recognition accuracy.

Normally, the first feature vector and the second feature vector do not have common feature components. However, they may have common feature components when this would clearly improve the recognition accuracy. In the first and second embodiments described above, the first recognition module 110 is described as operating using a recognition function based on Learning by Discriminant Analysis. However, this is not critical, and other recognition functions can alternatively be used.

In the embodiment of the pattern recognition apparatus described above with reference to FIG. 1, the transform vector matrix $\phi(K)$ that transforms the feature vectors in the feature transform module 114 may be replaced by the transform vector matrix $\phi(\{K\}')$ described above with reference to FIG. 2. If this is done, the transformed recognition dictionary $L(\{K\};\phi(K))$ 122 used in the second recognition module 116 is also replaced by the transformed recognition dictionary $L(\{K\};\phi(\{K\}'))$. Corresponding changes can be made to the feature transform module 134 and to the transformed recognition dictionary 138 used in the second recognition module 136 of the second embodiment shown in FIG. 4. In both of these cases, the transform vector matrix $\phi(\{K\}')$ is determined as described above using the rival pattern set of the category subset $\{K\}'$. The rival pattern set of the category subset $\{K\}'$ is composed of the rival pattern sets of all of the categories constituting the category subset $\{K\}'$. In the transformed recognition dictionary $L(\{K\};\phi(\{K\}'))$, the reference vector of each category K in the category set $\{K\}$ is transformed using the transform vector matrix $\phi(\{K\}')$ to generate the transformed reference vector for the category. When the category subset $\{K\}'$ is composed of only one category, $\{K\}'$ becomes K.

When there is only one category in the category set $\{K\}$ or in the category subset $\{K\}'$, $\{K\}$ and $\{K\}'$ can be set to K in the above explanation. The category subset $\{K\}'$ can include as many as all of the categories in the category set $\{K\}$.

The feature transform module 114, 134 can be operated so that it generates a transformed feature vector for each of the categories belonging to the category subset $\{K\}'$ by transforming the feature vector of the input pattern using the transform vector matrix $\phi(\{K\}')$. In this case, the feature transform module additionally generates the transformed feature vectors for the remaining categories belonging to the category set $\{K\}$ by transforming the feature vector of the input pattern using the transform vector matrix $\phi\{K\}$ of each of the remaining categories. Alternatively, the transform module 114, 134 can be operated so that it generates a transformed feature vector for each of the categories belonging to the category set (K) using the transform vector matrix $\phi(\{K\}')$ to transform the feature vector of the input pattern. The former mode of operation easily improves the recognition accuracy, but tends to have a greater demand for operational speed and memory capacity than the latter.

In a variation on the first embodiment of the pattern recognition apparatus according to the invention, the first recognition module 110 and the reliability determination module 112 are omitted. Each extracted feature vector X(p) extracted by the feature extraction module 108 is input unchanged to the feature transform module 114, and the categorizer determines the category of the input pattern solely on the basis of the difference values generated by the second recognition module 116.

In a variation on the second embodiment of the pattern recognition apparatus according to the invention described above with reference to FIG. 4, the reliability determination module 112 is omitted, the second feature extraction module 132, the feature transform module 134 and the second recognition module 136 operate on every input pattern, and the categorizer 118 determines the category of every input pattern using both the first difference value generated by the first recognition module 110 and the second difference value generated by the second recognition module 136.

Figure 5:
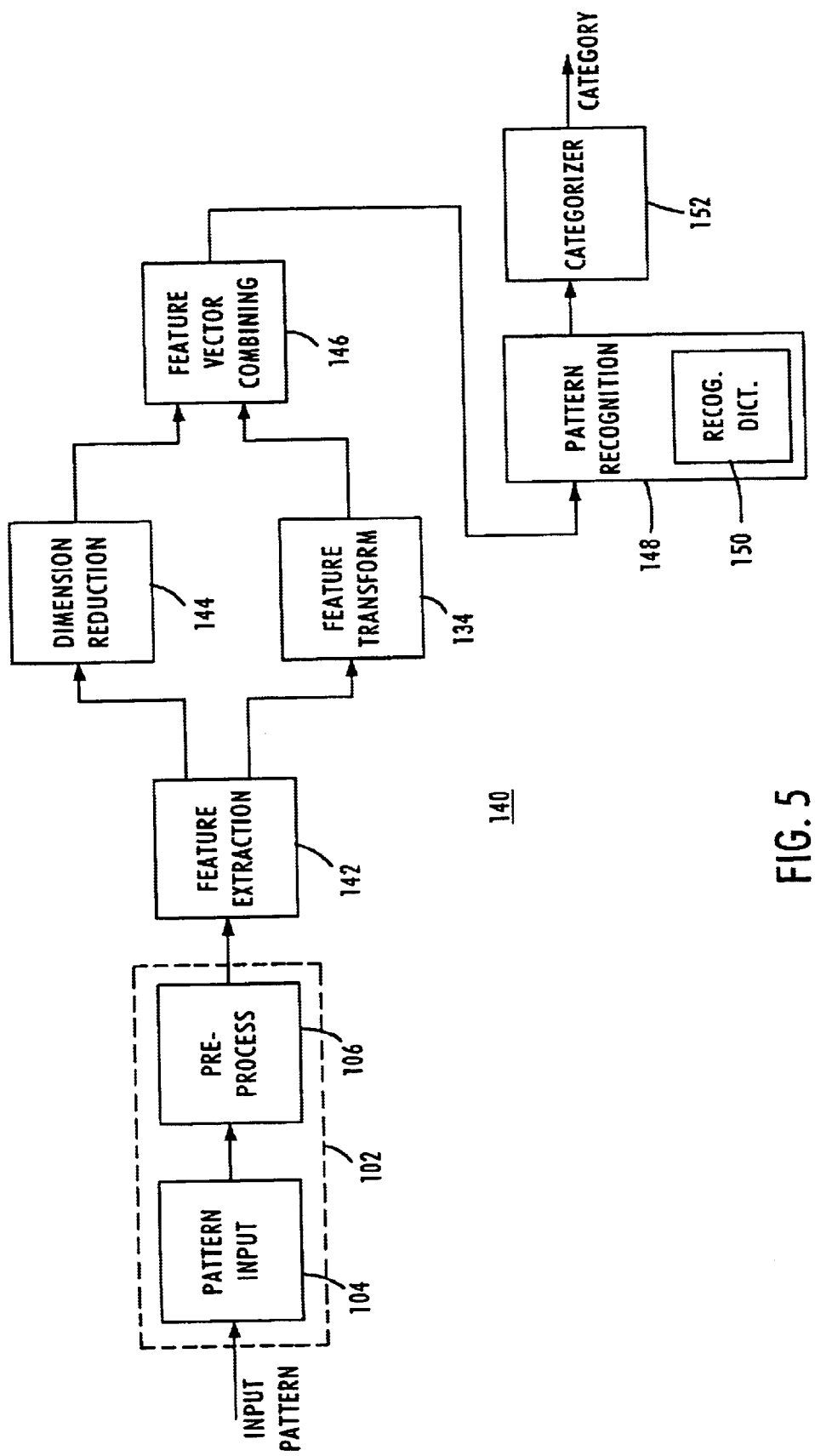
FIG. 5 is a block diagram of a third embodiment of the pattern recognition apparatus according to the invention.

FIG. 5 shows a third embodiment of the pattern recognition apparatus according to the invention. Elements of this embodiment that correspond to the first embodiment described above with reference to FIG. 1 are indicated using the same reference numerals and will not be described in detail. In this embodiment, the feature extraction module 142 extracts a first feature vector and a second feature vector from each pre-processed input pattern. The two feature vectors are independently processed before being combined by the feature vector combining module 146. The recognition module 148 adopts the combined feature vector as the matching vector when it performs the matching operation with the recognition dictionary.

The feature extraction module 142 extracts two sets of features from each pre-processed input pattern and expresses each set of features as a feature vector. The feature extraction module sends the first feature vector $X_1(p)$ to the dimension reduction module 144 and sends the second feature vector $X_2(p)$ to the feature transform module 134.

The dimension reduction module 144 reduces the number of dimensions of the first feature vector $X_1(p)$ using, for example, the known Karhunen-Loeve expansion, and sends the dimension-reduced feature vector $Z_1(p)$ to the feature vector combining module 148. The dimension reduction module may be omitted, in which case, $Z_1(p)=X_1(p)$.

When the number of dimensions of the first feature vector $X_1(p)$ is reduced, the m-th component $z_1(p;m)$ of the resulting dimension-reduced feature vector $Z_1(p)$ is given by:

$$z_1(p;m)=X_1(p)\psi(\$;m) \quad (8)$$

in which $\psi(\$,m)$ is an m-th degree dimension-reduced vector that can use the eigenvectors of the covariance matrix of all of the training patterns used in the learning processing performed by this embodiment. Other known dimension reduction techniques may alternatively be used. The $ symbol in the vector $\psi(\$;m)$ indicates that all of the training patterns are used.

The feature transform module 134 transforms the features of the second feature vector $X_2(p)$ using the transform vector matrix $\phi(Z_1;\{K\}')$. The transform vector matrix $\phi(Z_1;\{K\}')$ indicate a transform vector matrix that is generated by performing pattern recognition using the dimension-reduced feature vector $Z_1(p)$ extracted from the training patterns and is based on the rival pattern set of the category subset; $\{K\}'$.

The result of transforming the second feature vector $X_2(p)$ using the transform vector matrix $\phi(Z_1;\{K\}')$ is the transformed feature vector $Y_1(p;Z_1;\{K\}')$. The m-th feature component $y_1(p;Z_1;\{K\}';m)$ of the transformed feature vector $Y_1(Z_1;\{K\}')$ is given by:

$$y_1(p;Z_1;\{K\}';m)=X_2(p)\phi(Z_1;\{K\}';m)$$

in which $\phi(Z_1;\{K\}';m)$ is the m-th transform vector of the transform vector matrix $\phi(Z_1;\{K\}')$.

The feature vector combining module 146 extracts all of the components of the dimension-reduced feature vector $Z_1(p)$ and the transformed feature vector $Y_1(Z_1;\{K\}')$ to generate the combined feature vector $C(Z_1;Y_1)$. Alternatively, this module may generate the combined feature vector by extracting only specific components from the vectors received from the dimension reduction module 144 and the feature transform module 134. The feature vector combining module feeds the combined feature vector $C(Z_1;Y_1)$ to the recognition module 148.

The recognition module 148 adopts the combined feature vector $C(Z_1;Y_1)$ as its matching vector and performs a matching operation between the matching vector and the combined recognition dictionary 150. The processing performed by the recognition module 148 is similar to that performed by the first recognition module 110 described above with reference to FIG. 1 and generates a difference value for each category. The recognition module 148 forwards the difference values to the categorizer 152. The categorizer then determines the category of the input pattern by identifying the category corresponding to the smallest of the difference values received from the recognition module.

The combined recognition dictionary 150 used in this embodiment can be created by applying LDA using a combined feature vector $C(Z_1;Y_1)$ derived from each training pattern. Moreover, although dimension reduction is applied to reduce the number of dimensions of the first feature vector, the transform vector matrix $\phi(Z_1;\{K\}')$ is determined by first performing a recognition process using a recognition dictionary optimized for the dimension-reduced feature vector $Z_1(p)$. Based on the recognition result using this dictionary, rival pattern sets are compiled, and the transform vector matrix $\phi(Z_1;\{K\}')$ is found in the same way as the above-mentioned transform vector matrix $\phi(\{K\}')$.

This embodiment has an improved recognition accuracy and a rapid recognition processing time, but does not require that the combined recognition dictionary be large.

In this embodiment, the first feature vector can be the same as the second feature vector.

Figure 6:
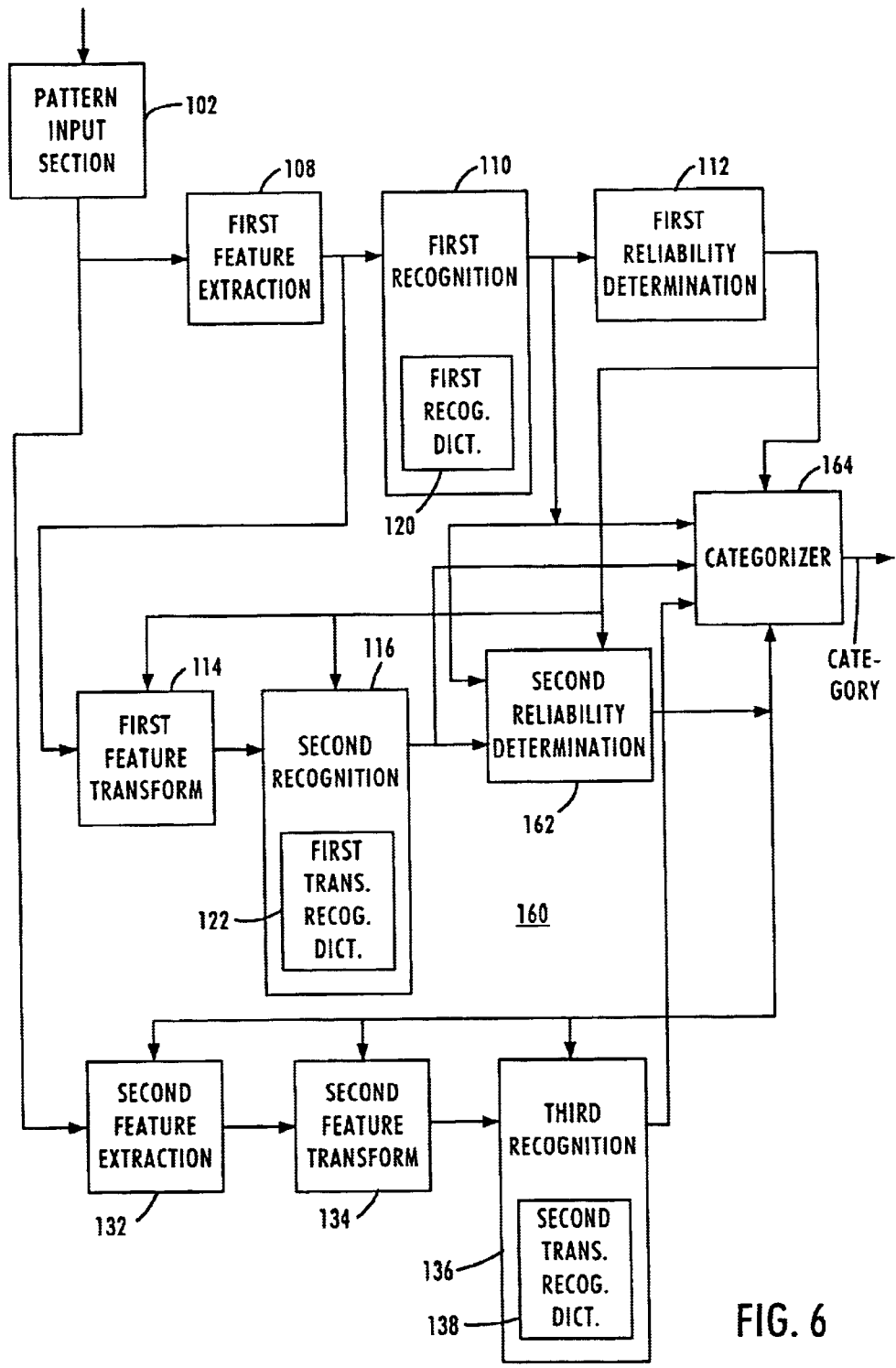
FIG. 6 is a block diagram of a fourth embodiment of the pattern recognition apparatus according to the invention.

FIG. 6 shows a fourth embodiment 160 of the pattern recognition apparatus according to the invention. Elements of this embodiment that correspond to the first and second embodiments described above with reference to FIGS. 1 and 4 are indicated using the same reference numerals and will not be described again here.

In the pattern recognition apparatus shown in FIG. 6, the pattern recognition apparatus 100 shown in FIG. 1 is modified by the addition of the second reliability determination module 160; and the feature extraction module 132, the feature transform module 134 and the recognition module 138 of the second embodiment shown in FIG. 4. In the fourth embodiment, these elements are called the second feature extraction module 132, the second feature transform module 134 and the third recognition module 136. The third recognition module includes the second transformed recognition dictionary 138.

The second reliability determination module 162 operates together with the first feature transform module 114 and the second recognition module 116 in response to the LOW state of the output signal of the first reliability determination module 112. The LOW state of this output signal indicates that pattern recognition based on the first difference values generated by the first recognition module 110 would not be reliable.

The second reliability determination module 162 receives the difference values generated by the first recognition module 112 and the second recognition module 116. The second reliability determination module operates similarly to the first reliability determination module 112 to determine the reliability of pattern recognition based on the difference values generated by the first and second recognition modules and generates an output signal whose state indicates the reliability of such pattern recognition operation. The output signal of the second reliability determination module is fed as a control signal to the second feature extraction module 132, the second feature transform module 134, the third recognition module 136 and the categorizer 164.

The second feature extraction module 132 receives the pre-processed patterns from the pattern input section 102, extracts a set of features from the input pattern and expresses the extracted features as a second feature vector. The features extracted by the second feature extraction module differ from the features extracted from the input pattern by the first feature extraction module 108. The second feature extraction module passes each second feature vector to the second feature transform module, which transforms the second feature vector, and passes the resulting transformed second feature vector to the third recognition module 136.

The third recognition module 136 adopts the transformed second feature vector as a matching vector, and performs a matching operation between the matching vector and the second transformed recognition dictionary 138. The matching operation generates a third difference value for each category. The third recognition module feeds the third difference values to the categorizer 164.

The categorizer 164 operates in response to the first and second output signals of the first reliability determination module 112 and the second reliability determination module 162, respectively, to determine the category of the input pattern using the difference values received from the first recognition module 110, the second recognition module 116 and the third recognition module 136. When the first reliability determination module output signal is in its HIGH state, the categorizer determines the category of the input pattern from the first difference values generated by the first recognition module alone. When the first reliability determination module output signal is in its LOW state and the second reliability determination module output signal is in its HIGH state, the categorizer determines the category of the input pattern from the first difference values generated by the first recognition module and from the second difference values generated by the second recognition module. When both the first and second reliability determination module output signals are in their LOW state, the categorizer determines the category of the input pattern from the first difference values generated by the first recognition module, the second difference values generated by the second recognition module and the third difference values generated by the third recognition module.

The transform vector matrices used in the feature vector transformations described above and the recognition dictionaries can be created by using the methods described above for creating such transform vector matrices and recognition dictionaries. For example, the transform vector matrices used in the feature transform modules 114 and 134 can be determined from rival pattern sets generated by performing a pattern recognition operation on training patterns using the first recognition module 110. The recognition dictionaries 120, 122 and 138 can be determined so that the recognition rate is maximum for preferably all of the training patterns up to the outputs of the first recognition module 110, the second recognition module 116 and the third recognition module 136 in which the recognition dictionaries are respectively located. Determining the transform vector matrix is subject to more variables than determining the recognition dictionary. For example, the transform vector matrices used in the feature transform modules 114 and 134 can be determined from the rival pattern sets generated by performing a pattern recognition operation on training patterns using the first recognition module 110. Alternatively, the transform vector matrices used in the second feature transform module 134 can be determined from the rival pattern set generated by performing a pattern recognition operation on training patterns using the first recognition module 110 and the second recognition module 116.

In a first variation on the embodiment just described, the second feature extraction module 132 is omitted, and the feature vectors generated by the first feature extraction module 108 are input to the second feature transform module 134. In a second variation, the second feature extraction module and the second feature transform module are omitted, and the transformed feature vectors generated by the first feature transform module 114 are directly input to the third recognition module 136.

The serial arrangement of a recognition module preceded by a feature extraction module, a feature transform module, or a feature extraction module and a feature transform module can be regarded as a recognition unit. In the embodiment shown in FIG. 6, three recognition units including a recognition unit that includes the third recognition module 136 are cascaded. Variations on this embodiment can have additional recognition units located upstream near the pattern input section 102 and additionally or alternatively downstream near the categorizer. The pre-processed pattern derived from the input pattern can be input to multiple recognition units, depending on the recognition result of one or more of the recognition units.

In the variations just described, the input patterns and the vectors derived by linearly transforming the feature vector representing each input pattern are input to the recognition unit, the recognition unit generates a recognition result, which may be an indication of the category of the input pattern or a set of difference values for the input pattern, and the categorizer finally determines the category of the input pattern from the outputs of the recognition units. Therefore, the transform vector matrix used by the recognition unit is determined based on the rival pattern set obtained from an upstream recognition unit. The recognition dictionary of each recognition unit is set to maximize, or at least to increase significantly, the recognition accuracy of pattern recognition performed on training patterns by the part of the pattern recognition apparatus up to, and including, the recognition unit.

Figure 7:
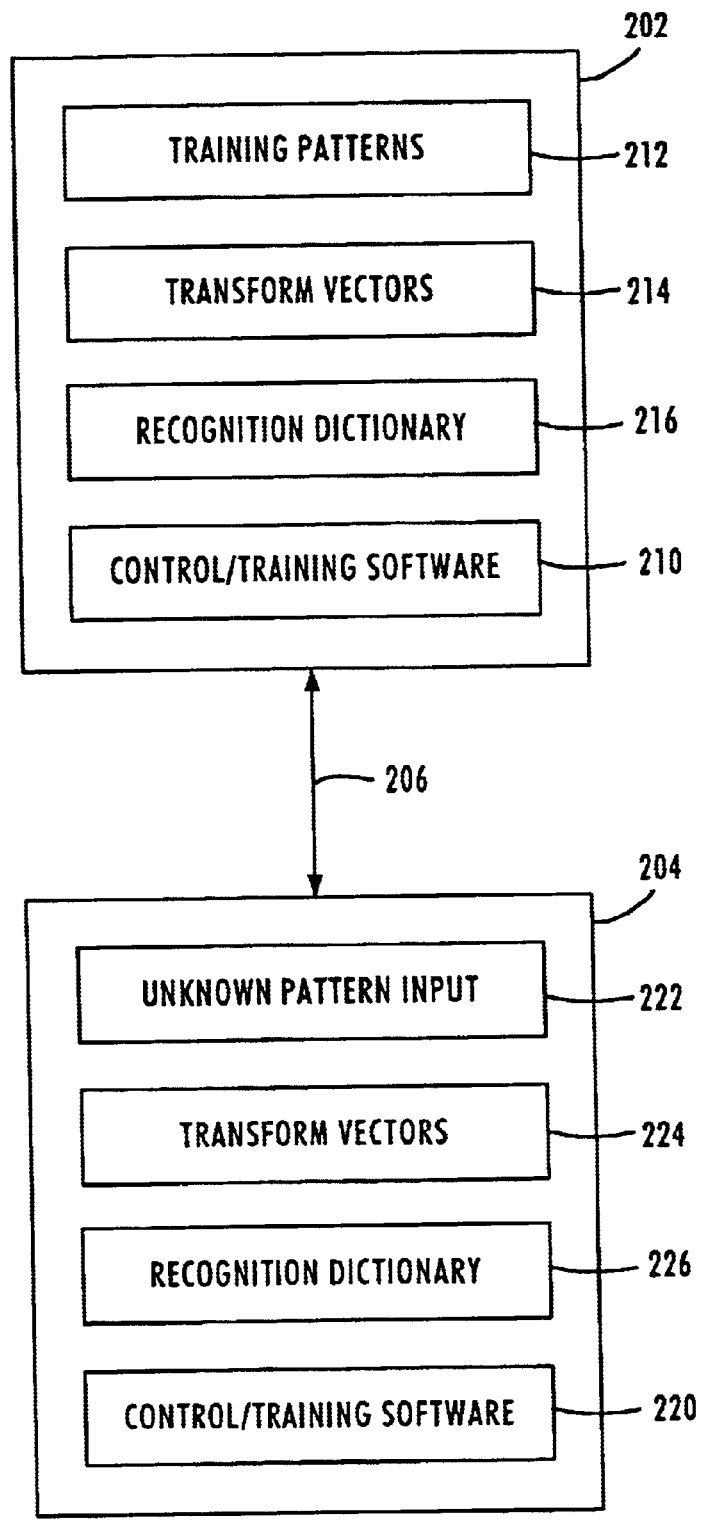
FIG. 7 is a block diagram of a pattern recognition device incorporating one embodiment the pattern recognition apparatus according to the invention.

FIG. 7 is a block diagram of a typical pattern recognition system 200. The system is composed of the learning center 202 and one or more terminals, a typical one of which is shown at 204, linked by the communication link or transferrable storage medium 206.

The learning center 202 uses built-in or externally-connected resources to run the control/training software 210 that processes the set 212 of training patterns to create the set 214 of transform vector matrices and the recognition dictionary 216. After the transform vector matrices and the recognition dictionary have been created by the learning center 202, they are stored using a suitable storage medium that can then be sent to the terminal 204. The terminal may be an optical character recognition (OCR) device that actually performs pattern recognition on unknown patterns temporarily stored in a storage medium. Alternatively, the transform vector matrices and recognition dictionary may be sent to the terminal 204 using the communication link 206. If the communication link used is bidirectional, the learning center can receive error patterns provided by the terminal, and can use the error patterns to update the transform vector matrices and the recognition dictionary. The learning center 202 may include a display (not shown) that can display messages such as the recognition accuracy. The system may include an input device (not shown) through which commands and data can be input.

The terminal 204 runs the control/recognition software 220 using built-in or externally-connected resources. Each pattern input using the pattern input module 222 is transformed by the transform vector matrices 224 and is matched to the recognition dictionary 226 to determine the category of the pattern.

Since substantial computer resources may be required to create the transform vector matrices 214 and the recognition dictionary 216, considerable scope exists for choosing an optimum balance between performance and cost of the computer on one hand with the sizes of the transform vector matrices and the recognition dictionary on the other. Either apparatus can perform both training and recognition.

According to the invention described above, when a first recognition module and a second recognition module are effectively combined, first vectors that effectively separate the in-category pattern set of each category from the rival pattern set of the category in the first recognition module are found. The second recognition module builds a recognition dictionary that enables as many as possible of the patterns misrecognized by the first recognition module to be correctly recognized. The second recognition module uses values of the feature vectors projected on the first vectors as feature vectors. By effectively combining two recognition modules, the invention markedly improves the recognition accuracy.

Moreover, pattern recognition apparatus and method according to the invention can be easily adapted to perform pattern recognition on different types of patterns simply by performing the learning process using the appropriate type of training patterns.

The embodiments of the pattern recognition apparatus disclosed herein can be constructed using dedicated hardware such as adders and multipliers. In a preferred embodiment, the pattern recognition apparatus is embodied in a computer program executed by a microprocessor (not shown) or digital signal processor. It should also be noted that, in computer-based and DSP-based embodiments, the various modules of the pattern recognition apparatus may be ephemeral, and may come into and out of existence as the various pattern recognition and learning operations are performed. Not all of the modules need exist simultaneously in the computer or DSP.

In the preferred embodiment, a computer including a pattern recognition program implements all of the processes described above. This disclosure provides sufficient information for a person of ordinary skill in the art to write a suitable pattern recognition program using a high-level (e.g., C or C++) or low-level programming language. Accordingly, the program listing itself is omitted. The pattern recognition program could be conveyed to the computer on which it is to run by embodying the program in a suitable tangible medium of expression, such as a set of floppy disks, a CD-ROM, a DVD-ROM, or could be transmitted to such computer by a suitable data link.

Although this disclosure describes illustrative embodiments of the invention in detail, it is to be understood that the invention is not limited to the precise embodiments described, and that various modifications may be practiced within the scope of the invention defined by the appended claims.

We claim:

1. A pattern recognition apparatus, comprising:

an input section adapted to receive input patterns including a pattern belonging to one of plural categories constituting a category set;

a first feature extraction module adapted to express features of the pattern as a first feature vector;

a first feature transform module adapted to use transform vector matrices to transform at least part of the first feature vector to generate an at least partially transformed first feature vector corresponding to each of the categories, the transform vector matrices including a transform vector matrix generated in response to a rival pattern set comprising rival patterns misrecognized or nearly misrecognized as belonging to plural ones of the categories, the plural ones of the categories constituting a category subset, the at least partially transformed first feature vector being common to the ones of the categories constituting the category subset;

a recognition section including a recognition dictionary adapted to store matching information and first transformed matching information for each of the categories, the first transformed matching information having been transformed using the transform vector matrices, and to generate at least one difference value for each of the categories by performing a matching operation between:
the matching information and the first transformed matching information, at least one matching vector derived at least from the at least partially transformed first feature vector corresponding to each of the categories; and a categorizer adapted to identify the one of the categories to which the pattern belongs in response to the at least one difference value.

2. The pattern recognition apparatus of claim 1, in which:

the first feature transform module is adapted to transform all of the first feature vectors to generate a first transformed feature vector corresponding to each of the categories;

the recognition section includes:
a first recognition module adapted to generate a first difference value for each of the categories by performing a matching operation between the matching information and a first matching vector derived from the first feature vector, and
a second recognition module adapted to generate a second difference value for each of the categories by performing a matching operation between the first transformed matching information and a second matching vector derived from the first transformed feature vector corresponding to each of the categories;

the apparatus additionally comprises a reliability determination module adapted to receive the first difference value for each of the categories and to indicate when pattern recognition based on the first difference value for each of the categories would be reliable; and the categorizer is adapted to identify the one of the categories to which the pattern belongs in response to:
the first difference value alone for each of the categories when the reliability determination module indicates that pattern recognition based on the first difference value for each of the categories would be reliable, and
the first difference value and the second difference value for each of the categories otherwise.

3. The pattern recognition apparatus of claim 2, in which:

the pattern recognition apparatus additionally comprises a second feature extraction module adapted to express features of the pattern as a second feature vector, the second feature extraction module being interposed between the input section and the first feature transform module; and the first feature transform module adapted to transform the second feature vector generate the transformed feature vectors.

4. The pattern recognition apparatus of claim 3, in which:

the first feature vector generated by the first feature extraction module is adapted to express a first set of the features of the pattern; and the second feature vector generated by the second feature extraction module is adapted to express a second set of the features of the pattern.

5. The pattern recognition apparatus of claim 4, in which the first set of features and the second set of features partially overlap.

6. The pattern recognition apparatus of claim 2, in which:

the apparatus additionally comprises:
a second reliability determination module adapted to receive the first and second difference values for each of the categories and to indicate when pattern recognition based on the first and second difference values for each of the categories would be reliable;
a second feature extraction module adapted to express features of the pattern as a second feature vector; and
a second feature transform module adapted to use second transform vector matrices to transform the second feature vector to generate a second transformed feature vector corresponding to each of the categories;

the recognition dictionary adapted to additionally store second transformed matching information for each of the categories, the second transformed matching information having been transformed using the second transform vector matrices;

the recognition section includes a third recognition module adapted to generate a third difference value for each of the categories by performing a matching operation between the second transformed matching information and a third matching vector derived from the second transformed feature vector corresponding to each of the categories; and the categorizer adapted to identify the one of the categories to which the pattern belongs in response to:
the first difference value for each of the categories alone when the first reliability determination module indicates that pattern recognition based on the first difference value for each of the categories would be reliable;
the first and second difference values for each of the categories alone when the second reliability determination module indicates that pattern recognition based on the first and second difference values for each of the categories would be reliable, and
the first, second and third difference values for each of the categories otherwise.

7. The pattern recognition apparatus of claim 6, in which:
the first feature vector generated by the first feature extraction module is adapted to express a first set of the features of the pattern; and
the second feature vector generated by the second feature extraction module is adapted to express a second set of the features of the pattern.

8. The pattern recognition apparatus of claim 7, in which the first set of features and the second set of features partially overlap.

9. The pattern recognition apparatus of claim 2, in which:
a serial arrangement of the first feature extraction module and the first recognition module constitutes a first recognition unit;
a serial arrangement of the first feature transform module and the second recognition module collectively constitute a second recognition unit; and
the pattern recognition apparatus additionally comprises an additional recognition unit including a serial arrangement of:
at least one of a feature extraction module and a feature transform module, and
a recognition module including a transformed recognition dictionary optimized to recognize patterns not reliably recognized by the first and second recognition units.

10. The pattern recognition apparatus of claim 1, in which:
the first feature extraction module is adapted to express a first set of the features of the pattern as the first feature vector and additionally express a second set of the features of the pattern as a second feature vector;
the first feature transform module is adapted to transform all of the first feature vector to generate a first transformed feature vector corresponding to each of the categories; and
the apparatus additionally comprises a feature vector combining module adapted to combine the second feature vector and the first transformed feature vector corresponding to each of the categories to generate the at least partially transformed first feature vector corresponding to each of the categories, the feature vector combining module being interposed between the first feature extraction module and the recognition section.

11. The pattern recognition apparatus of claim 10, in which:
the second feature vector has a number of dimensions,
the apparatus additionally comprises a dimension reduction module adapted to reduce the number of dimensions of the second feature vector to generate a dimension-reduced second feature vector, the dimension reduction module being interposed between the first feature extraction module and the feature vector combining module; and
the feature vector combining module adapted to combine the dimension-reduced second feature vector and the first transformed feature vector corresponding to each of the categories to generate the at least partially transformed feature vector corresponding to each of the categories.

12. The pattern recognition apparatus of claim 11, in which the feature vector combining module is adapted to generate the combined feature vector by extracting a subset of at least one of:
the dimension-reduced second feature vector, and
the first transformed feature vector corresponding to each of the categories.

13. A method for recognizing patterns, the method comprising:
receiving input patterns including a pattern belonging to one of plural categories constituting a category set;
expressing features of the pattern as a feature vector;
transforming at least part of the feature vector using transform vector matrices to generate an at least partially transformed feature vector corresponding to each of the categories, the transform vector matrices including a transform vector matrix generated in response to a rival pattern set comprising rival patterns misrecognized or nearly misrecognized as belonging to plural ones of the categories, the plural ones of the categories constituting a category subset, the at least partially transformed feature vector being common to the ones of the categories constituting the category subset;
performing a matching operation between:
matching information and transformed matching information for each of the categories, the transformed matching information being matching information transformed using the transform vector matrices, a matching vector derived from the at least partially transformed feature vector corresponding to each of the categories, to generate at least one modified difference value for each of the categories; and
identifying the one of the categories to which the pattern belongs in response to the at least one difference value.

14. The method of claim 13, in which the transform vector matrices include a transform vector matrix for one of (a) a category belonging to the category set, and (b) a category subset composed of plural ones of the categories belonging to the category set, the transform vector matrix being generated by:
receiving training patterns whose respective categories are defined and expressing features of the training patterns as first feature vectors;
identifying the categories to which the training patterns respectively belong by performing a matching operation between first matching vectors derived from the first feature vectors and the matching information;

comparing the categories to which the training patterns are identified as belonging with the respective defined categories to define a rival pattern set for a respective one of (a) the category, and (b) the category subset;

determining an average vector from the feature vectors of all of the training patterns defined as belonging to the respective one of (a) the category, and (b) the category subset;

calculating a difference vector for each of the training patterns belonging to the rival pattern set using the average vector;

calculating an autocorrelation matrix of the difference vectors; and adopting eigenvectors of the autocorrelation matrix as transform vectors constituting the transform vector matrix for the respective one of (a) the category, and (b) the category subset.

15. The method of claim 14, in which:

the eigenvectors of the autocorrelation matrix have respective eigenvalues; and adopting eigenvectors includes:
    summing the eigenvalues of all of the eigenvectors of the autocorrelation matrix to generate a first sum value, and
    adopting the eigenvectors in order of descending eigenvalues as adopted eigenvectors and summing the eigenvalues of the adopted eigenvectors to generate a second sum value until the second sum value exceeds a predetermined fraction of the first sum value.

16. The method of claim 14, in which:

the method additionally comprises:
    calculating a covariance matrix from the feature vectors of all of the training patterns defined as belonging to the category, and
    multiplying the covariance matrix by the autocorrelation matrix to generate a product matrix; and
    in adopting eigenvectors, eigenvectors of the product matrix are adopted instead of eigenvectors of the autocorrelation matrix as the transform vectors of the transform vector matrix.

17. The method of claim 14, in which the transformed recognition information for a category belonging to the category set is generated by:

receiving training patterns whose respective categories are defined and expressing features of the training patterns as feature vectors;

identifying the categories to which the training patterns respectively belong by performing a matching operation between a first matching vector derived from the first feature vector and the matching information;

comparing the categories to which the training patterns are identified as belonging with the respective defined categories to define a rival pattern set for the category;

transforming the feature vectors of the training patterns using the transform vector matrix for one of (a) the category and (b) a category subset to which the category belongs, the category subset being composed of plural ones of the categories belonging to the category set, to generate respective transformed feature vectors;

performing a discriminant analysis using the transformed feature vectors to generate a discriminant function;

calculating a modified difference value for each of the categories using the discriminant function;

re-identifying the categories to which the training patterns respectively belong in response to the modified difference value for each of the categories;

re-comparing the categories to which the training patterns are identified as belonging in response to the modified difference values with the respective defined categories to determine whether additional patterns are misrecognized as belonging to the category; and generating the transformed recognition information using the discriminant function when no additional patterns are misrecognized, and otherwise including the additional patterns in the rival pattern set of the category, and repeating the discriminant analysis performing, modified difference value calculating, category re-identifying and re-comparing operations until no additional patterns are misrecognized.

18. The method of claim 14, in which:

the method additionally comprises:
    performing a matching operation between the matching information for each of the categories and a first matching vector derived from the feature vector to generate a first difference value for each of the categories;
    in response to the first difference values, generating a reliability indication indicating when pattern recognition based on the first difference values would be reliable;

the one of the categories to which the pattern belongs is identified in response to a sum of the first difference value for each of the categories, and a multiple of the modified difference value for each of the categories when the reliability indication indicates that pattern recognition based on the first difference values would not be reliable; and the multiple is determined by:
    setting the multiplier to an initial value,
    receiving training patterns whose respective categories are defined,
    performing the expressing, first matching operation performing, reliability indication generating operations on the training patterns to identify as identified training patterns the training patterns for which the reliability indication indicates that pattern recognition based on the first difference values would not be reliable as identified training patterns,
    performing the transforming operation on the feature vectors of the identified training patterns, and
    performing the following sequence on the identified training patterns until the multiplier has a value corresponding to a maximum recognition accuracy:
        again performing second matching and identifying operations;
        comparing the categories to which the identified training patterns are identified as belonging with the respective defined categories to determine a recognition accuracy; and
        changing the multiplier.

19. The method of claim 13, in which the transformed recognition information for a category belonging to the category set is generated by:

receiving training patterns whose respective categories are defined and expressing features of the training patterns as feature vectors;

identifying the categories to which the training patterns respectively belong by performing a matching operation between a first matching vector derived from the first feature vector and the matching information;

comparing the categories to which the training patterns are identified as belonging with the respective defined categories to define a rival pattern set for the category;

transforming the feature vectors of the training patterns using the transform vector matrix for one of (a) the category and (b) a category subset to which the category belongs, the category subset being composed of plural ones of the categories belonging to the category set, to generate respective transformed feature vectors;

performing a discriminant analysis using the transformed feature vectors to generate a discriminant function;

calculating a modified difference value for each of the categories using the discriminant function;

re-identifying the categories to which the training patterns respectively belong in response to the modified difference value for each of the categories;

re-comparing the categories to which the training patterns are identified as belonging in response to the modified difference values with the respective defined categories to determine whether additional patterns are misrecognized as belonging to the category; and generating the transformed recognition information using the discriminant function when no additional patterns are misrecognized, and otherwise including the additional patterns in the rival pattern set of the category, and repeating the discriminant analysis performing, modified difference value calculating, category re-identifying and re-comparing operations until no additional patterns are misrecognized.

20. The method of claim 13, in which:

the method additionally comprises:

performing a matching operation between the matching information for each of the categories and a first matching vector derived from the feature vector to generate a first difference value for each of the categories;

in response to the first difference values, generating a reliability indication indicating when pattern recognition based on the first difference values would be reliable;

the one of the categories to which the pattern belongs is identified in response to a sum of the first difference value for each of the categories, and a multiple of the modified difference value for each of the categories when the reliability indication indicates that pattern recognition based on the first difference values would not be reliable; and the multiple is determined by:

setting the multiplier to an initial value, receiving training patterns whose respective categories are defined, performing the expressing, first matching operation performing, reliability indication generating operations on the training patterns to identify as identified training patterns the training patterns for which the reliability indication indicates that pattern recognition based on the first difference values would not be reliable as identified training patterns, performing the transforming operation on the feature vectors of the identified training patterns, and performing the following sequence on the identified training patterns until the multiplier has a value corresponding to a maximum recognition accuracy:

again performing second matching and identifying operations;

comparing the categories to which the identified training patterns are identified as belonging with the respective defined categories to determine a recognition accuracy; and changing the multiplier.

21. A program storage device, readable by a machine, tangibly embodying a program of instructions executable by the machine to perform a method for recognizing patterns, the method comprising:

receiving input patterns including a pattern belonging to one of plural categories constituting a category set;

expressing features of the pattern as a feature vector;

transforming at least part of the feature vector using transform vector matrices to generate an at least partially transformed feature vector corresponding to each of the categories, the transform vector matrices including a transform vector matrix generated in response to a rival pattern set comprising rival patterns misrecognized or nearly misrecognized as belonging to plural ones of the categories, the plural ones of the categories constituting a category subset, the at least partially transformed feature vector being common to the ones of the categories constituting the category subset;

performing a matching operation between:

matching information and transformed matching information for each of the categories, the transformed matching information being matching information transformed using the transform vector matrices, a matching vector derived from the at least partially transformed feature or nearly misrecognized vector corresponding to each of the categories, to generate at least one modified difference value for each of the categories; and identifying the one of the categories to which the pattern belongs in response to the at least one difference value.

22. The program storage device of claim 21, in which the transform vector matrices include a transform vector matrix for one of (a) a category belonging to the category set, and (b) a category subset composed of plural ones of the categories belonging to the category set, the transform vector matrix being generated by:

receiving training patterns whose respective categories are defined and expressing features of the training patterns as first feature vectors;

identifying the categories to which the training patterns respectively belong by performing a matching operation between first matching vectors derived from the first feature vectors and the matching information;

comparing the categories to which the training patterns are identified as belonging with the respective defined categories to define a rival pattern set for a respective one of (a) the category, and (b) the category subset;

determining an average vector from the feature vectors of all of the training patterns defined as belonging to the respective one of (a) the category, and (b) the category subset;

calculating a difference vector for each of the training patterns belonging to the rival pattern set using the average vector;

calculating an autocorrelation matrix of the difference vectors; and adopting eigenvectors of the autocorrelation matrix as transform vectors constituting the transform vector matrix for the respective one of (a) the category, and (b) the category subset.

23. The program storage device of claim 22, in which:

the eigenvectors of the autocorrelation matrix have respective eigenvalues; and adopting eigenvectors includes:
  summing the eigenvalues of all of the eigenvectors of the autocorrelation matrix to generate a first sum value, and
  adopting the eigenvectors in order of descending eigenvalues as adopted eigenvectors and summing the eigenvalues of the adopted eigenvectors to generate a second sum value until the second sum value exceeds a predetermined fraction of the first sum value.

24. The program storage device of claim 22, in which: the method additionally comprises:
  calculating a covariance matrix from the feature vectors of all of the training patterns defined as belonging to the category, and
  multiplying the covariance matrix by the autocorrelation matrix to generate a product matrix; and
in adopting eigenvectors, eigenvectors of the product matrix are adopted instead of eigenvectors of the autocorrelation matrix as the transform vectors of the transform vector matrix.

25. The program storage device of claim 22, in which the transformed recognition information for a category belonging to the category set is generated by:
  receiving training patterns whose respective categories are defined and expressing features of the training patterns as feature vectors;
  identifying the categories to which the training patterns respectively belong by performing a matching operation between a first matching vector derived from the first feature vector and the matching information;
  comparing the categories to which the training patterns are identified as belonging with the respective defined categories to define a rival pattern set for the category;
  transforming the feature vectors of the training patterns using the transform vector matrix for one of (a) the category and (b) a category subset to which the category belongs, the category subset being composed of plural ones of the categories belonging to the category set, to generate respective transformed feature vectors;
  performing a discriminant analysis using the transformed feature vectors to generate a discriminant function;
  calculating a modified difference value for each of the categories using the discriminant function;
  re-identifying the categories to which the training patterns respectively belong in response to the modified difference value for each of the categories;
  re-comparing the categories to which the training patterns are identified as belonging in response to the modified difference values with the respective defined categories to determine whether additional patterns are misrecognized as belonging to the category; and
  generating the transformed recognition information using the discriminant function when no additional patterns are misrecognized, and otherwise including the additional patterns in the rival pattern set of the category, and repeating the discriminant analysis performing, modified difference value calculating, category re-identifying and re-comparing operations until no additional patterns are misrecognized.

26. The program storage device of claim 22, in which: the method additionally comprises:
  performing a matching operation between the matching information for each of the categories and a first matching vector derived from the feature vector to generate a first difference value for each of the categories;
  in response to the first difference values, generating a reliability indication indicating when pattern recognition based on the first difference values would be reliable;
  the one of the categories to which the pattern belongs is identified in response to a sum of the first difference value for each of the categories, and a multiple of the modified difference value for each of the categories when the reliability indication indicates that pattern recognition based on the first difference values would not be reliable; and
  the multiple is determined by:
    setting the multiplier to an initial value,
    receiving training patterns whose respective categories are defined,
    performing the expressing, first matching operation performing, reliability indication generating operations on the training patterns to identify as identified training patterns the training patterns for which the reliability indication indicates that pattern recognition based on the first difference values would not be reliable as identified training patterns, performing the transforming operation on the feature vectors of the identified training patterns, and
    performing the following sequence on the identified training patterns until the multiplier has a value corresponding to a maximum recognition accuracy;
    again performing second matching and identifying operations;
    comparing the categories to which the identified training patterns are identified as belonging with the respective defined categories to determine a recognition accuracy; and
    changing the multiplier.

27. The program storage device of claim 21, in which the transformed recognition information for a category belonging to the category set is generated by:
  receiving training patterns whose respective categories are defined and expressing features of the training patterns as feature vectors;
  identifying the categories to which the training patterns respectively belong by performing a matching operation between a first matching vector derived from the first feature vector and the matching information;
  comparing the categories to which the training patterns are identified as belonging with the respective defined categories to define a rival pattern set for the category;
  transforming the feature vectors of the training patterns using the transform vector matrix for one of (a) the category and (b) a category subset to which the category belongs, the category subset being composed of plural ones of the categories belonging to the category set, to generate respective transformed feature vectors;
  performing a discriminant analysis using the transformed feature vectors to generate a discriminant function;
  calculating a modified difference value for each of the categories using the discriminant function;
  re-identifying the categories to which the training patterns respectively belong in response to the modified difference value for each of the categories;
  re-comparing the categories to which the training patterns are identified as belonging in response to the modified difference values with the respective defined categories to determine whether additional patterns are misrecognized as belonging to the category; and generating the transformed recognition information using the discriminant function when no additional patterns are misrecognized, and otherwise including the additional patterns in the rival pattern set of the category, and repeating the discriminant analysis performing, modified difference value calculating, category re-identifying and re-comparing operations until no additional patterns are misrecognized.

28. The program storage device of claim 21, in which:

the method additionally comprises:

performing a matching operation between the matching information for each of the categories and first matching vector derived from the feature vector to generate a first difference value for each of the categories;

in response to the first difference values, generating a reliability indication indicating when pattern recognition based on the first difference values would be reliable;

the one of the categories to which the pattern belongs is identified in response to a sum of the first difference value for each of the categories, and a multiple of the modified difference values for each of the categories when the reliability indication indicates that pattern recognition based on the first difference values would not be reliable; and the multiple is determined by:

setting the multiplier to an initial value, receiving training patterns whose respective categories are defined, performing the expressing, first matching operation performing, reliability indication generating operations on the training patterns to identify as identified training patterns the training patterns for which the reliability indication indicates that pattern recognition based on the first difference values would not be reliable as identified training patterns, performing the transforming operation on the feature vectors of the identified training patterns, and performing the following sequence on the identified training patterns until the multiplier has a value corresponding to a maximum recognition accuracy;

again performing second matching and identifying operations;

comparing the categories to which the identified training patterns are identified as belonging with the respective defined categories to determine a recognition accuracy; and changing the multiplier.

* * * * *